(12) United States Patent
Park

(10) Patent No.: US 10,952,825 B2
(45) Date of Patent: Mar. 23, 2021

(54) DENTAL IMPLANT STRUCTURE

(71) Applicant: Taewon Tech. Co., Ltd., Busan (KR)

(72) Inventor: Ki Woong Park, Gwacheon-si (KR)

(73) Assignee: Taewon Tech. Co., Ltd., Busan (KR)

( * ) Notice: Subject to any disclaimer, the term of this patent is extended or adjusted under 35 U.S.C. 154(b) by 0 days.

(21) Appl. No.: 16/320,166

(22) PCT Filed: Sep. 1, 2017

(86) PCT No.: PCT/KR2017/009587
§ 371 (c)(1),
(2) Date: Jan. 24, 2019

(87) PCT Pub. No.: WO2018/044113
PCT Pub. Date: Mar. 8, 2018

(65) Prior Publication Data
US 2020/0205940 A1    Jul. 2, 2020

(30) Foreign Application Priority Data
Sep. 2, 2016   (KR) .......................... 10-2016-0113032

(51) Int. Cl.
*A61C 8/00*     (2006.01)

(52) U.S. Cl.
CPC ............ *A61C 8/0074* (2013.01); *A61C 8/006* (2013.01); *A61C 8/0054* (2013.01); *A61C 8/0069* (2013.01)

(58) Field of Classification Search
CPC ... A61C 8/0074; A61C 8/0063; A61C 8/0054; A61C 8/006; A61C 8/0069
See application file for complete search history.

(56) References Cited

U.S. PATENT DOCUMENTS

| 5,904,663 A | 5/1999 | Braverman et al. |
| 6,375,465 B1 * | 4/2002 | Engman ............... A61C 8/0022 433/172 |

(Continued)

FOREIGN PATENT DOCUMENTS

| JP | 2009-28361 A | 2/2009 |
| JP | 2015-525602 A | 9/2015 |

(Continued)

OTHER PUBLICATIONS

International Search Report dated Dec. 6, 2017, in PCT/KR2017/009587, filed on Sep. 1, 2017.

*Primary Examiner* — Ralph A Lewis
(74) *Attorney, Agent, or Firm* — Oblon, McClelland, Maier & Neustadt, L.L.P.

(57) ABSTRACT

A dental implant structure includes a fixture fixed to an alveolar bone, an abutment coupled to the fixture and configured to attach an artificial tooth thereto, and a coupling element configured to couple the fixture and the abutment to each other. In the dental implant structure, the fixture includes a lower fixture portion fixed to the alveolar bone and an upper fixture portion coupled to the abutment, a first thread is formed on a part or all of a surface of the lower fixture portion so as to be fixed to the alveolar bone, the lower fixture portion has a shape extending along a rotation axis of the first thread, a second thread is formed on a part or all of a surface of the upper fixture portion, and the upper fixture portion has a shape extending along a rotation axis of the second thread.

10 Claims, 15 Drawing Sheets

(56) References Cited

U.S. PATENT DOCUMENTS

| | | |
|---|---|---|
| 6,416,487 B1 | 7/2002 | Braverman et al. |
| 6,878,127 B2 | 4/2005 | Brady et al. |
| 7,312,023 B2 | 12/2007 | Brady et al. |
| 7,556,768 B2 | 7/2009 | Brady et al. |
| 7,846,650 B2 | 12/2010 | Brady et al. |
| 8,152,526 B2 | 4/2012 | Adams |
| 8,329,388 B2 | 12/2012 | Brady et al. |
| 8,334,094 B2 | 12/2012 | Brady et al. |
| 8,349,550 B2 | 1/2013 | Brady et al. |
| 8,403,667 B2 | 3/2013 | Adams |
| 8,465,283 B2 | 6/2013 | Adams |
| 8,469,710 B2 | 6/2013 | Bondar |
| 8,734,155 B2 | 5/2014 | Bondar |
| 8,814,570 B2 | 8/2014 | Adams |
| 2002/0143283 A1 | 10/2002 | Braverman et al. |
| 2002/0146413 A1 | 10/2002 | Brady et al. |
| 2002/0159995 A1 | 10/2002 | Brady et al. |
| 2002/0197249 A1 | 12/2002 | Brady et al. |
| 2002/0197250 A1 | 12/2002 | Brady et al. |
| 2002/0197252 A1 | 12/2002 | Brady et al. |
| 2002/0198487 A1 | 12/2002 | Brady et al. |
| 2003/0224328 A1* | 12/2003 | Sapian .............. A61C 8/0077 433/173 |
| 2005/0061742 A1 | 3/2005 | Brady et al. |
| 2005/0239041 A1 | 10/2005 | Brady et al. |
| 2006/0057142 A1 | 3/2006 | Brady et al. |
| 2007/0093739 A1 | 4/2007 | Brady et al. |
| 2008/0032262 A1 | 2/2008 | Bondar |
| 2008/0032263 A1 | 2/2008 | Bondar |
| 2008/0118892 A1 | 5/2008 | Adams |
| 2009/0029318 A1 | 1/2009 | Hayashi et al. |
| 2010/0069816 A1 | 3/2010 | Brady et al. |
| 2010/0323326 A1* | 12/2010 | Reed .................. A61C 8/0018 433/174 |
| 2015/0030994 A1 | 1/2015 | Adams |
| 2015/0157426 A1 | 6/2015 | Choi |

FOREIGN PATENT DOCUMENTS

| | | |
|---|---|---|
| KR | 20-0350606 Y1 | 5/2004 |
| KR | 10-2006-0025263 A | 3/2006 |
| KR | 10-2006-0025770 A | 3/2006 |
| KR | 10-1559823 B1 | 10/2015 |
| KR | 10-1727732 B1 | 5/2017 |

* cited by examiner

DENTAL IMPLANT STRUCTURE

TECHNICAL FIELD

The present invention relates to a dental implant structure used for implantation of an artificial tooth. More particularly, the present invention relates to a dental implant structure fixed to alveolar bone at the time of implantation of an artificial tooth so as to function as a dental root to which an artificial tooth is attached.

BACKGROUND ART

A tooth implant structure is implanted to an alveolar bone so as to form an artificial dental root when a tooth is lost such that an artificial dental tooth is attached thereto. When the tooth implant structure is inserted into an alveolar bone tissue and coalesces into the surrounding alveolar bone tissue, an artificial tooth is attached onto the tooth implant structure.

The dental implant structure includes a fixture that is inserted into the alveolar bone and fixedly coalesces into the alveolar bone tissue, and an element called an abutment coupled to the upper side of the fixture such that the artificial tooth is attached thereto.

In a conventional dental implant structure, the fixture has a threaded hole formed in the center of the fixture in the longitudinal direction and the abutment has a hole formed through the abutment from the upper end to the lower end thereof and a step formed in the middle of the hole. A screw is inserted into the hole from the upper end of the abutment such that the head of the screw is supported on the step, and the threads of the screw are engaged with the threads of the hole formed in the fixture, whereby the abutment is fixed to the fixture.

A typical form of such a prior art tooth implant structure is illustrated in FIG. 1.

A dental implant structure 100 illustrated in FIG. 1 is called a submerged-type structure. A cylindrical fixture 110 having threads 111 formed on the surface thereof is implanted in the alveolar bone 10. An inclined mounting surface 112, the diameter of which decreases from the upper end of the fixture 110 toward the lower end, is formed radially inwardly and a fastening hole 113 having threads 114 to which a fastening screw 130 is fastened is formed at the center of the mounting surface 112.

The abutment 120 includes a columnar lower portion 122, the diameter of which decreases toward the lower end thereof so as to abut with the mounting surface 112 of the fixture and a columnar upper portion 121, the diameter of which decreases toward the upper end thereof. The lower portion 122 is inserted into the mounting surface 122 of the fixture 110 from the lower end thereof so that a part thereof is placed and supported on the mounting surface 112.

A fastening hole 123 is formed in the center of the abutment 120 to penetrate the abutment 120 from the upper end to the lower end of the abutment 120, and the lower portion of the fastening hole 123 from the middle point in the longitudinal direction to the lower end thereof has a diameter smaller than that of the upper portion thereof so that a step 124 is formed between the upper portion and the lower portion of the fastening hole 123.

After the fixture 110 is implanted in the alveolar bone 10, the lower portion 122 of the abutment 120 is placed on the mounting surface 112 of the fixture 110 to abut on the mounting surface 112 so as to be supported, the fastening screw 130 is inserted into the fastening hole 123 from the upper end of the abutment 120 such that the threads 131 formed in the lower portion of the fastening screw 130 are engaged with the threads 114 formed in the fastening hole 113 of the fixture 110, and the head 132 of the screw 130 is supported on the step 124 formed in the fastening hole 123 of the abutment 120.

In this state, a crown 140, which is an artificial tooth, bonded to the upper portion 121 of the abutment 120 with cement, so that the implantation of the crown is completed. In this structure, the remaining portion of the upper portion 121 of the abutment 120, which is not inserted into the mounting surface 112 of the fixture 110 is in contact with a gum 20.

However, the prior art tooth implant structure having such a configuration has some serious problems.

The crown placed at the uppermost position in the tooth implant structure receives occlusal load acting in the process of masticating food or the like. The occlusal load is applied, through the abutment on which the crown is fixed, to the screw-coupled portion between the fixture and the fastening screw and to the portion where the abutment abuts on the fixture so as to be supported.

The occlusal load acting on the crown also acts on the center of crown not only in the vertical direction but also in an inclined direction with respect to the vertical direction. Further, the occlusal load is also applied to a position deviating from the center of the crown. The horizontal component of the occlusal load acts on the screw-coupled portion between the fixture and the fastening screw as load in the horizontal direction.

Here, the "vertical direction" means a direction in which a dental implant structure is implanted, that is, the axial direction of the substantially columnar fixture and the abutment, and the "horizontal direction" means a direction parallel to a plane perpendicular to the vertical direction. Herein, the terms "vertical direction" and "horizontal direction" are used in the meaning of the above-mentioned definition.

Due to the occlusal load acting on the crown, the stress acting on the screw-coupled portion between the fixture and the abutment causes the screw-coupled portion to be loosened, and in particular, the horizontal stress applied due to the occlusal load further facilitates the loosening of the screw-coupled portion. This is because the screw joint exhibits a strong supporting force for the load in the direction substantially perpendicular to the thread surfaces, but it is weak against the load in the horizontal direction on the thread surfaces.

The occlusal load generated by using of the teeth continuously acts on the fastening screw, thereby causing the fastening screw to be loosened and, in the worst case, causing the fastening screw to be broken.

Therefore, even after implantation and coalescence of the fixture to alveolar bone tissue have been successfully performed and thus an implant procedure has been successfully performed, it is necessary to continuously receive a procedure of re-tightening the fastening screw after removing the crown due to the loosening phenomenon of the fastening screw that fixes the abutment to the fixture.

When the loosening phenomenon is left untreated without such a procedure, a clearance is formed between the abutment and the fixture due to the loosening of the fastening screw, resulting in gingivitis and oral odor, which lead to inflammation of alveolar bone, resulting in absorption of alveolar bone tissue.

Particularly, when a strong occlusal load is applied due to a mastication habit or the fastening screw is subjected to a strong load or is continuously shaken by leaving the loosened state of the fastening screw for a long time, a case in which the fastening screw is broken and thus it is necessary to receive the implant procedure including re-implantation also occurs frequently.

In the prior art tooth implant structure 100 illustrated in FIG. 1, since the mounting surface 112 is formed in the upper portion of the fixture 110 from the upper end to the lower side of the fixture 110, the thickness of the outer wall of the upper portion of the fixture 110 is very thin.

Therefore, there is a problem in that the occlusal load acting on the crown acts on the outer wall of the fixture or the outer wall of the abutment, whereby the outer wall of the fixture or the outer wall of the abutment is broken.

An invention conceived by the inventor of the present application, which solves the problems of the prior art tooth implant structure, is disclosed in Korean Patent No. 1559823 (Document 1).

FIG. 2 illustrates one embodiment of the dental implant structure disclosed in Document 1.

In the dental implant structure 200 of Document 1, a fixture 210 is implanted in an alveolar bone 10, in which the fixture 210 is divided into an upper portion 211 and a lower portion 212. In the lower fixture portion, threads 216 are formed on the columnar surface thereof and is implanted to the alveolar bone 10, and the threads allow the fixture to be implanted to the alveolar bone such that the fixture coalesces into the alveolar bone tissue.

Threads 217 are formed on a part or all of the surface of the upper portion 211 of the fixture.

The abutment 220 includes an upper portion 221 having an outer surface to which the crown 230 is attached and a lower portion 222 which functions as a connection portion between the upper portion 221 of the abutment and the fixture while abutting on the gum 20.

A cavity 223 is formed from the upper portion of the abutment to the lower end of the lower portion, and threads 224 are formed in the cavity so as to be engaged with the threads 217 on the upper portion of the fixture. After the fixture is implanted to the alveolar bone, the threads 217 of the fixture and the threads of the abutment 224 are engaged with each other while the upper fixture portion is inserted into the cavity in the abutment, whereby the abutment is coupled to the fixture 210.

The dental implant structure of the document 1 has a great advantage over the conventional submerged-type dental implant structure illustrated in FIG. 1.

In the dental implant structure of Document 1, when the same occlusal load acts on the upper end surface of the crown compared with the submerged-type dental implant structure of FIG. 1, horizontal stress acting on the threads in the coupled portion between the fixture and abutment becomes small.

The influence of the abutment and fixture structure on the stress acting on the threads fastening the abutment and fixture to each other by the occlusal load acting on the crown will be described with reference to FIG. 4.

In FIG. 4, the symbols indicate the following items.

F1: occlusal load acting on the upper end of a crown in an oblique direction

Fx: horizontal component of the occlusal load applied to the upper end of the crown Fz: vertical component of the occlusal load applied to the upper end of the crown F2: occlusal load acting on a side portion of the upper end of the crown fx: horizontal stress applied to the middle portion of a screw in the longitudinal direction of the screw fz: vertical stress applied to the middle portion of the screw in the longitudinal direction of the screw L1: vertical distance from the upper end of the crown to the middle portion of the screw in the longitudinal direction of the screw L2: horizontal distance from the axis of the screw or the center of the fixture to the center of the screw T: torque applied by occlusal load to a position corresponding to the center of the screw in the longitudinal direction on the axis of the fixture The left side of FIG. 4 illustrates a cross section of the prior art submerged-type implant structure illustrated in FIG. 1, and the right side illustrates a cross section of the dental implant structure according to the invention of Document 1. Although the two implant structures are illustrated with the same dimensions for ease of understanding and comparison of differences in structures, the lengths of the distances L1 and L2 are considerably different from each other due to the differences in the two structures.

First, the occlusal load F1 acting on the upper end of the crown may be divided into a horizontal component Fx and a vertical component Fz.

The vertical component Fz of the occlusal load acts as the substantially vertical stress fz on the surface of the threads of the screw-coupled portion between the fixture and the abutment, but the horizontal component Fx acts as the horizontal stress fx on the threads of the screw-coupled portion. The horizontal component Fx of the occlusal load and the horizontal stress fx have the following relationship.

$$Fx*L1=T=fx*L2$$

Therefore, $fx=Fx*L1/L2$

That is, with respect to the same occlusal load, the horizontal stress acting on the screw-coupled portion between the fixture and the abutment increases as L1 becomes larger and decreases as L2 becomes larger.

In other words, the horizontal stress acting on the screw-coupled portion between the fixture and the abutment increases as the vertical distance from the upper end of the crown to the screw-coupled portion increases, and decreases as the horizontal distance from the center of the fixture to the screw, that is, the diameter of the screw increases.

In addition, the horizontal stress acting on screw-coupled portion between the fixture and the abutment due to the occlusal load acting on the side portion of the upper end of the crown has the following relationship.

$$F2*L3=T=fx*L2$$

$$fx=F2*L3/L2$$

According to the above equation, under the condition in which L3 and F2 are constant, the horizontal stress fx acting on the screw-coupled portion between the fixture and abutment due to the occlusal load F2 becomes smaller as the diameter of the screw L2 becomes larger.

In other words, the horizontal stress acting on the screw-coupled portion between the fixture and the abutment due to the occlusal load acting on the side portion of the upper end of the crown becomes smaller as the horizontal distance from the center of the fixture to the screw, that is, the diameter of the screw, becomes larger.

When comparing the prior art submerged-type dental implant structure 100 and the dental implant structure 200 of Document 1 based on the above-described relationship, in the dental implant structure 200, since the threads 217 and 224 that couples the fixture 210 and the abutment to each other are disposed above the upper end of the alveolar bone, the vertical distance L1 from the upper end of the crown to the screw-coupled portion is short, and the threads 217 are formed on the outer surface of the upper fixture portion 211 and the threads 224 are directly formed on the abutment itself without using a separate coupling screw so as to couple the fixture and the abutment, it is possible to set the radius of the threads, that is, the distance L2 to be long.

Therefore, in the dental implant structure according to the invention of Document 1, since L1 is set to be small and L2 is set to be large, the stress acting on the threads coupling the fixture and the abutment to each other due to the occlusal loads F1 and F2 is minimized.

On the contrary, in the prior art submerged-type dental implant structure 100, since the fastening screw 130 that couples the fixture 110 to the abutment 120 is fastened at the lower portion in the entire implant structure, the vertical distance L1 from the upper end of the crown 140 to the screw-coupled portion is long. Further, since the fastening screw 130 is coupled to the fastening hole 113 formed inside the fixture 110, it is impossible to increase the diameter of the screw.

Accordingly, in the prior art submerged-type dental implant structure 100, since L1 is large and L2 is small, the stress acting on the threads coupling the fixture and the abutment due to the occlusal loads F1 and F2 is large.

As described above, due to the structural differences between the prior art submerged-type dental implant structure, in the dental implant structure of Document 1, the stress acting in the horizontal direction on the threads coupling the abutment and the fixture due to the occlusal load acting on the crown is minimized, and thus the occurrence of the problem of loosening or breaking the threads by the stress acting in the horizontal direction is minimized.

Meanwhile, the Korean Patent Document No. 0938991 (Document 2) discloses another prior art dental implant structure in which a screw-coupled portion that connects and fixes a fixture and an abutment are disposed above the upper end of an alveolar bone as in the dental implant structure of Document 1.

The configuration of the dental implant structure disclosed in Document 2 is described with reference to FIG. 3.

A fixture 251 illustrated in FIG. 3 includes an implantation portion 261 formed on the lower side thereof to be implanted into the alveolar bone, a tapered portion 262 formed above the implantation portion, a post portion 263 formed above the tapered portion, and threads 63a formed around the post portion. A post groove 271 is formed in the lower portion of the abutment 252 and the abutment 252 is fixed to the fixture 251 by the coupling between the threads formed in the post groove 271 and the threads 263a of the post portion 263.

A plurality of flat portions 263 formed by removing the threads 263a of the post portion 263 are distributed around the post portion 263 while intersecting the curved portions of the threads, and the flat portions 263 are engaged with a tool for rotating the abutment 252.

The dental implant structure having this structure is also referred to as a mini-implant, and is typically used for restoration of a front tooth, where the occlusal load is weakly applied, or for supporting a short-term temporary prosthesis.

The mini-implant used for such a purpose usually employs a cement bonding method or a frictional bonding method in which a mallet or the like is pressed against the abutment in order to connect the abutment to the fixture.

However, the mini-implant structure of document 2 uses a screw-connecting method in order to achieve simple, easy, and stable fixation.

Meanwhile, in the implant structure of Document 2, the distance from the upper end of the abutment 2 to the screw-connected portion is shorter than the distance from the prior art submerged-type dental implant structure 100. Therefore, it is possible to obtain an additional effect of suppressing the screw-loosening phenomenon as in the implant structure of Document 1.

However, since a substantial portion of the threads is damaged by the plurality of flat portions 131, the screw-coupling force is remarkably reduced, and the above-mentioned effect is canceled. As a result, there arises a problem that the screw-coupling is easily loosened as in the prior art submerged-type dental implant structure.

As described above, the dental implant structure having the configuration according to the invention of Document 1 solves the problem of loosening or breaking of the screw that couples the fixture and the abutment in the prior art submerged-type dental implant structure or the dental implant structure according to the invention of Document 2. However, these dental implant structures also have the same problems as the existing implants.

It is desirable that an abutment in a dental implant structure be formed in various shapes according to the shape of a natural tooth to be replaced. A front tooth serves to cut food, and has an asymmetrical shape in which the distal center of the crown is considerably eccentric and inclined with respect to the longitudinal axis extending in the up-and-down direction of the tooth. Thus, basically, occlusal load greatly acts on the lateral side thereof. In addition, the front tooth also has a shape in which in terms of a crown size, the length from the longitudinal axis of the tooth to the crown surface varies. Therefore, the abutment to which an artificial tooth is attached should also have an asymmetric inclined shape such that an aesthetically formed artificial tooth can be attached thereto.

A molar tooth acts to grind food like a millstone, and thus the occlusal load acts thereon strongly, and in particular, food is easily caught between the teeth or attached to the gums. In addition, although there is no incline, the deviation of the length from the longitudinal axis of the tooth to the surface of the crown is more severe than that of the front teeth. Thus, the abutment should also have a shape corresponding thereto, so that the original function thereof can be performed well and the food is not caught or attached.

However, in order to adopt this type of abutment, the implant structures according to the inventions of Document 1 or Document 2 has a limitation in adopting this type of abutment. The implant structure according to the invention of Document 1 adopts a method of forming threads in the fixture and the abutment and screw-coupling the abutment to the fixture by rotating the abutment. Thus, in order to prevent interference between the teeth around the portion in which the fixture is implanted and the abutment, the abutment should have a shape in which the distance from the rotational axis to the circumferential surface is equivalent, that is, in a circular shape, Consequently, despite the advantages of the screw being much hardly loosened than the existing implant structure, there is problems in that it is impossible to form the abutment to have a sufficiently large size and it is difficult to form the abutment in various asymmetric shapes matched to the shapes of natural teeth.

As a problem caused by this, when the existing circular abutment is coupled at the time of applying the implant structure according to the invention of Document 1 to a front tooth, there is a troublesome combined with the conventional abutment for the reason described above, and it is troublesome to grind the abutment directly in the oral cavity in order to make an inclination.

In the case of applying such an implant structure according to the related art to a molar in which a large occlusal load is applied, when the artificial tooth is bonded to a small circular abutment, the holding force against the artificial tooth is lowered, and thus the artificial tooth may be detached prematurely even after the final bonding.

In addition, as described above, in order to assure that the food is not caught nor attached to the teeth or gums in the molar region, it is essential that a proper void between the teeth and a proper proximal contact between teeth be formed such that the artificial tooth has a harmonious relationship with the adjacent teeth and gums. However, it is impossible to accomplish this using a small circular abutment.

If a proper void between teeth and a proximal contact between teeth are not ensured, oral hygiene is difficult to manage and the long-term prognosis of the implant may deteriorate.

Meanwhile, even in the case of the implant according to the prior art illustrated in FIG. 1, it is theoretically possible to adopt an asymmetric large abutment having various shapes, but it is impossible to actually use it.

The reason for this is that when an asymmetric large abutment corresponding to the crown shape in a natural tooth is used, the physical stress acting on the fixture itself and the screw-connected portion rather than the circular small abutment increases. Therefore, the screw loosening phenomenon and breaking of the fixture, abutment, or the threads according to the screw loosening phenomenon occur more easily. Particularly, in such a dental implant structure having the above-described configuration, screw loosening and breaking phenomena become serious because it is impossible to implant a fixture having a large diameter capable of exerting a strong coalescence force with respect to the alveolar bone.

DETAILED DESCRIPTION OF THE INVENTION

Technical Problem

The present invention has been made in view of the problems of the prior art described above and aims to provide a dental implant structure in which screws that couples a fixture and an abutment is not loosened or broken by horizontal stress applied by an occlusal load and the shape of the abutment is not limited, so that the implant structure can take any abutment shape according to the shape of a natural tooth as well as a circular abutment as in the prior art.

In particular, the present invention aims to provide a dental implant structure configured such that the abutment can be coupled to or removed from the fixture without rotating the abutment.

Another object of the present invention is to provide a dental implant structure that has a strong coalescence force with respect to an alveolar bone so as to withstand an occlusal load applied to the fixture.

Technical Solution

The above-described object can be achieved by a dental implant structure of the present invention that includes a fixture fixed to an alveolar bone, an abutment coupled to the fixture and configured to attach an artificial tooth thereto, and a coupling element configured to couple the fixture and the abutment to each other so as to form an artificial toot root.

In the dental implant structure of the present disclosure, the fixture includes a lower fixture portion fixed to the alveolar bone and an upper fixture portion coupled to the abutment, a first thread is formed on a part or all of a surface of the lower fixture portion so as to be fixed to the alveolar bone, the lower fixture portion has a shape extending along a rotation axis of the first thread, a second thread is formed on a part or all of a surface of the upper fixture portion, and the upper fixture portion has a shape extending along a rotation axis of the second thread. The abutment includes an inner cavity into which the upper fixture portion is inserted from a lower end thereof, and an artificial tooth attachment surface provided on an outer surface thereof. The coupling element includes therein a third thread coupled to the second thread on the upper fixture portion, and has a shape extending along a rotation axis of the third thread, and a part or all of the coupling element is inserted into the cavity of the abutment and a part or all of a circumferential surface of the coupling element is in contact with a circumferential surface of the cavity of the abutment. The third thread of the coupling element and the second thread of the upper fixture portion are coupled to each other and a part or all of the abutment is placed between the coupling element and the fixture in the direction of the rotation axis of the second thread. The coupling element is configured to press the abutment toward the lower fixture portion by coupling of the third thread and the second thread, and the upper fixture portion is provided with a surface configured to support the abutment against pressing of the coupling element so as to fix the abutment to the fixture.

According to the configuration of the dental implant structure of the present disclosure, the dental implant structure is configured by fixing the lower fixture portion to the alveolar bone, then inserting the upper fixture portion into the cavity of the abutment such that the abutment is seated on the upper fixture portion, and causing the third thread to be coupled to the second thread of the upper fixture portion, whereby the fixture, the abutment, and the coupling element are coupled to each other and the abutment is fixedly supported between the coupling element and the fixture without rotating the abutment.

In the configuration of the present invention, When the coupling element is rotationally inserted into the cavity of the abutment and the third thread of the coupling element is coupled to the second thread on the upper fixture portion, the coupling element is fixedly coupled to the fixture. Thus, a part or all of the abutment is placed between the upper fixture portion and the coupling element, and the abutment is pressed toward the lower fixture portion to be supported on the surface of the upper fixture portion. Consequently, the abutment is fixedly supported between the coupling element and the fixture with respect to the direction of the rotation axis of the second thread, that is, the longitudinal direction of the upper fixture portion.

In addition, the coupling element is inserted into the cavity of the abutment such that the circumferential surface of the coupling element is brought into contact with the circumferential surface of the cavity of the abutment so as to fix the position of the abutment on a plane perpendicular to the rotation axis of the second thread of the upper fixture portion.

Since a frictional force is exerted between the abutment and the fixture by a force applied by the coupling element to press the abutment against the fixture in the longitudinal direction, the abutment is fixed to the fixture or the coupling element in the circumferential direction about the rotation axis of the threads, whereby the rotation of the abutment is suppressed.

The abutment is fixed to the fixture by the above-described structure and action. Since the screw-coupling required for such fixation is performed in the upper fixture portion, the vertical distance between the upper end surface of the artificial tooth and the screw-coupled portion is shortened.

Therefore, due to an occlusal load acting on the upper end surface of the artificial tooth, the horizontal stress acting on the third thread and the second thread is minimized, whereby the possibility of loosening of screw-coupling and the possibility of breakage of thread are minimized.

In the prior art dental implant structure of the type illustrated in FIG. 1, since the thread for fixing the abutment on the fixture is formed inside the portion fixed to the alveolar bone in the fixture, the diameter of the thread is small and the thickness of the portion fixed to the alveolar bone in the fixture is small. Thus, the strength of the fixture becomes weak. The second thread provided for fixing the abutment to the fixture in the dental implant structure of the present invention is formed in the upper fixture portion disposed above the alveolar bone rather than the lower fixture portion fixed to the alveolar bone. Thus, the diameter of the second thread can be made larger than that of the prior art dental implant structure, whereby the horizontal stress acting on the thread by the occlusal load of the artificial tooth becomes small and the strength of the lower fixture portion fixed to the alveolar bone is not weakened.

In addition, in the dental implant structure of the present disclosure, the abutment is fixed to the fixture by moving the abutment in the longitudinal direction of the fixture such that the abutment is seated on the upper fixture portion without rotating the abutment itself and rotating the coupling element so as to fix the abutment to the fixture. Thus, the outer surface of the abutment to which the artificial tooth is attached does not interfere with the surrounding teeth during the coupling of the abutment.

Therefore, in the dental implant structure of the present invention, the shape of the outer surface of the abutment to which the artificial tooth is attached can take various shapes as needed according to the attachment of the artificial tooth.

In the present invention, as a specific construction for fixing the abutment to the fixture, the coupling element, the abutment, the upper fixture portion may be configured in several types as follows.

First, a part or all of the circumferential surface of the cavity of the abutment and the circumferential surface of the coupling element are formed as inclined surfaces inclining radially inward toward the lower fixture portion and are brought into contact with each other, whereby the abutment is fixedly supported between the coupling element and the fixture.

According to this configuration, as the coupling element is screw-coupled to the upper fixture portion, the circumferential surface of the coupling element presses the circumferential surface of the cavity of the abutment in the radial direction and toward the lower fixture portion and supports the abutment in the upper fixture portion. Thus, the abutment is fixed to the fixture in the longitudinal direction of the fixture.

Particularly, in addition to the fixation in the longitudinal direction, the rotation of the abutment is prevented by the frictional force acting between the fixture and the abutment and between the coupling element and the abutment, and as the circumferential surface of the coupling element presses the circumferential surface of the cavity of the abutment, the fixation of the abutment with respect to the fixture in the radial direction of the fixture, that is, on a plane perpendicular to the rotation axis of the second thread of the fixture is achieved.

Second, the cavity of the abutment is provided with a surface on which a lower end surface of the coupling element abuts, whereby the abutment is fixedly supported between the coupling element and the fixture.

With this configuration, the lower end surface of the coupling element pushes the surface of the cavity of the abutment by the fastening force that fastens the third thread of the coupling element to the second thread of the upper fixture portion and thus the abutment is pressed against and supported on the surface of the upper fixture portion. Thus, a frictional force acts between the surfaces of the abutment and the upper fixture portion and thus the rotation of the abutment with respect to the fixture is also prevented.

Third, the coupling element is provided with a surface on which the upper end surface of the abutment abuts, whereby the abutment is fixedly supported between the coupling element and the fixture.

With this configuration, when the third thread of the coupling element and the second thread of the fixture are fastened to each other, the fastening force of fastening the third thread of the coupling element to the second thread of the upper fixture portion causes the surface of the coupling element to strongly push the upper end surface of the abutment, whereby a strong frictional force acts between the lower end surface of the abutment and the surface of the upper fixture portion to prevent the rotation of the abutment with respect to the fixture.

Fourth, the cavity of the abutment is provided with a protrusion that protrudes radially inwardly, such that the upper end surface of the protrusion abuts on a lower end surface of the coupling element and a lower end surface of the protrusion abuts on the upper fixture portion, whereby the abutment is fixedly supported on the fixture.

With this configuration, as in the third aspect, when the third thread of the coupling element and the second thread of the fixture are fastened to each other, the fastening force of fastening the third thread of the coupling element to the second thread of the upper fixture portion causes the surface of the coupling element to strongly push the upper end surface of the abutment, whereby a strong frictional force acts between the lower end surface of the abutment and the surface of the upper fixture portion to prevent the rotation of the abutment with respect to the fixture.

As an additional configuration for the dental implant structure according to the present invention, a circumferential surface having a deviation in the distance from the rotation axis of the second thread is provided on the upper fixture portion, and a surface engaged with the circumferential surface is provided in the cavity of the abutment, so that the rotation of the abutment with respect to the fixture can be reliably prevented.

In the present invention, by the coupling force according to the screw-coupling of the third thread of the coupling element and the second thread of the upper fixture portion, a frictional force acts between the fixture and the abutment and between the coupling element and abutment, thereby preventing the rotation of the abutment. However, the rotation of the abutment can be prevented more reliably by the circumferential surface of the above-mentioned upper fixture portion and the surface of the abutment.

In addition, as another additional construction for preventing rotation of the abutment, a protrusion extending in a direction parallel to the longitudinal direction of the rotation axis of the second thread may be formed on the upper fixture portion, and a groove may be formed on the abutment to be engaged with the protrusion. On the contrary, a protrusion extending in a direction parallel to the longitudinal direction of the rotation axis of the second thread may be formed on the abutment, and a groove may be formed in the upper fixture portion to be engaged with the protrusion. With this configuration in which the protrusion and the groove are engaged with each other, the rotation of the abutment is prevented more reliably.

BEST MODE FOR CARRYING OUT THE INVENTION

Figure 1:
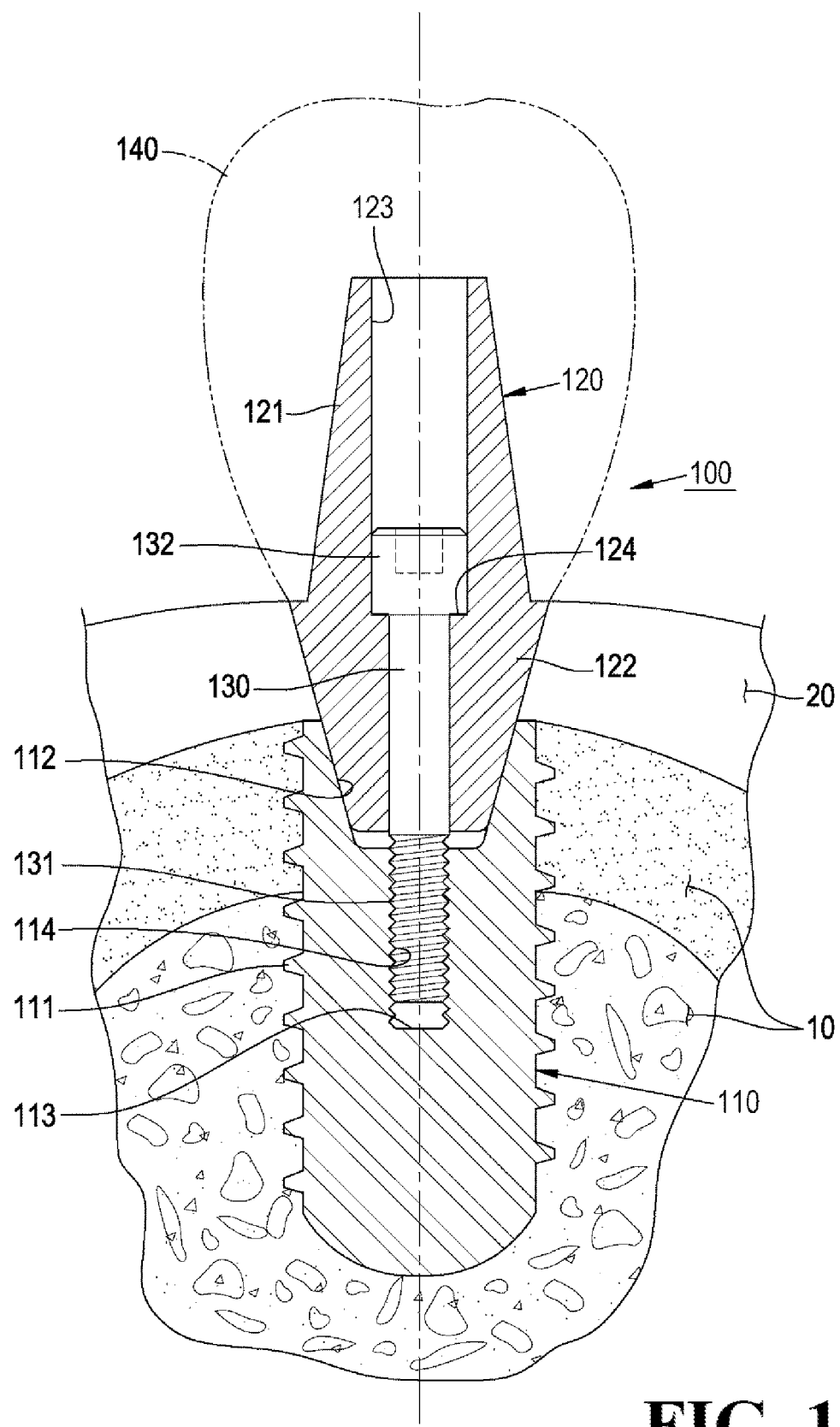
FIGS. 1 to 3 are vertical sectional views of dental implant structures according to the prior art.
Figure 2:
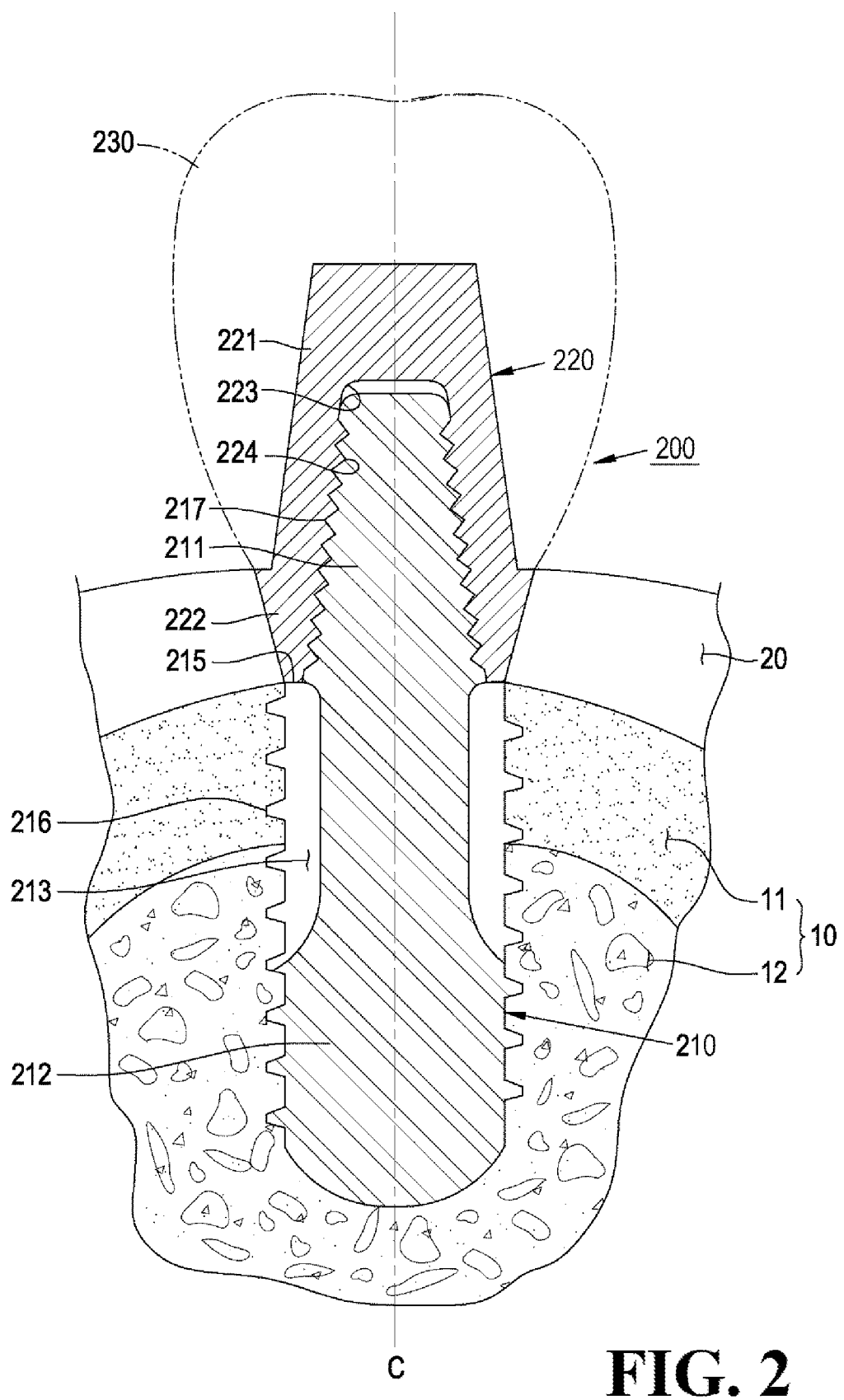
Figure 3:
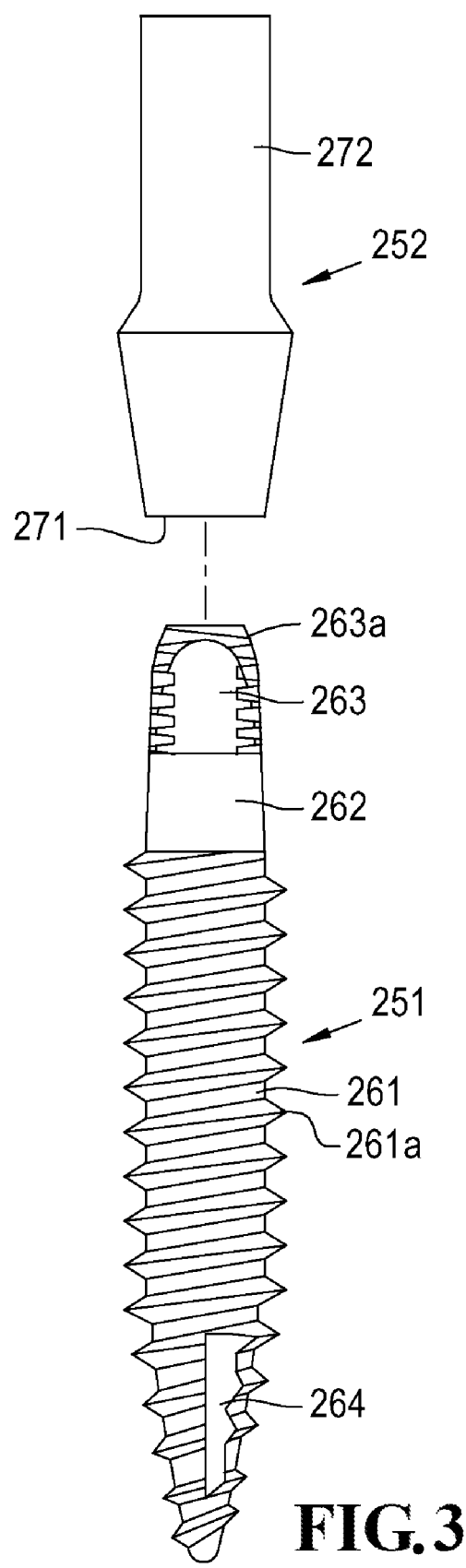
Figure 4:
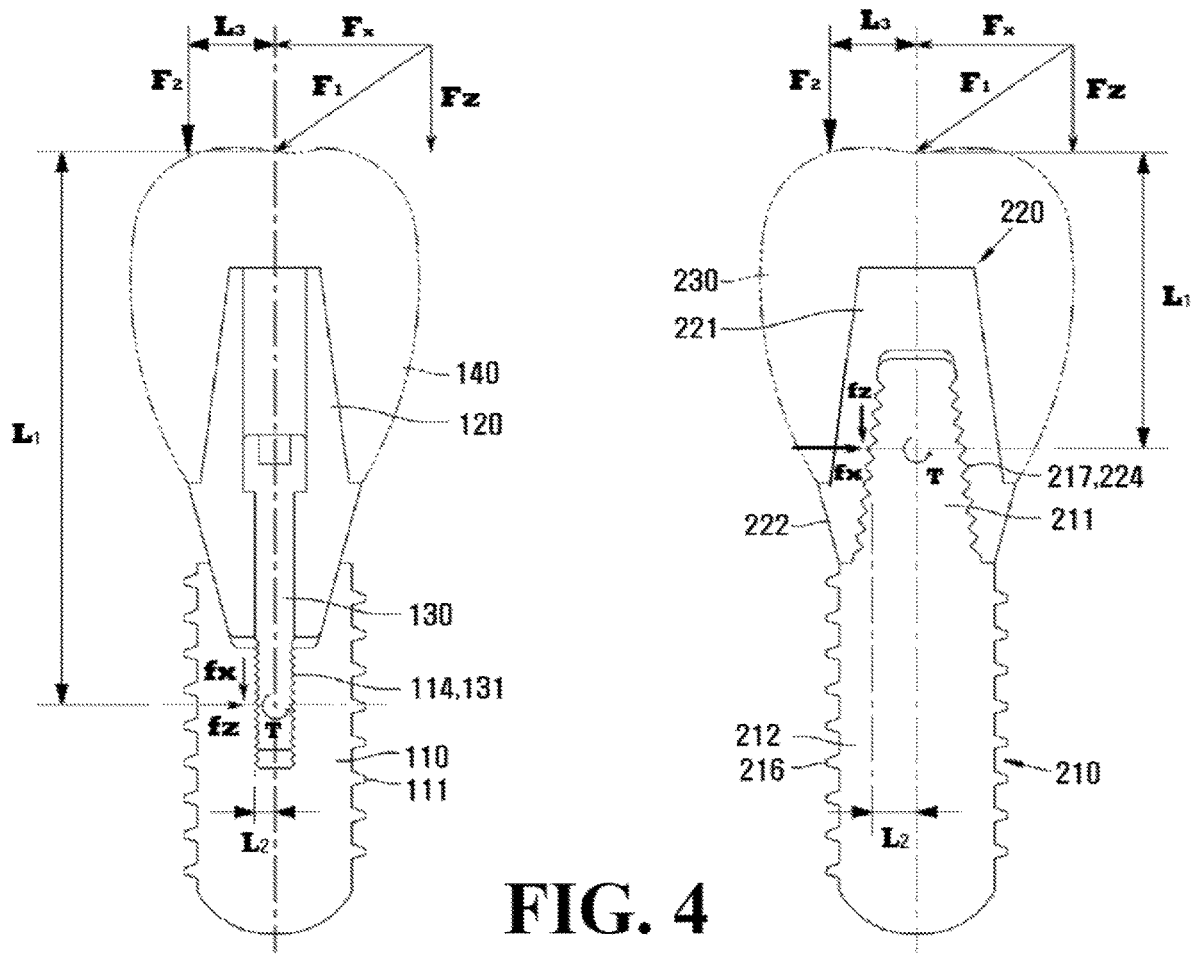
FIG. 4 illustrate conceptual vertical sectional views illustrating differences in stress in a horizontal direction acting on a screw-coupled portion in the prior art dental implant structures.

Hereinafter, configurations and functions of embodiments of the present disclosure will be described with reference to the accompanying drawings.

First, the construction and function of a dental implant structure 300 according to the first embodiment of the present invention will be described with reference to FIGS. 5 and 6.

The dental implant structure 300 according to the first embodiment includes a fixture 310 which is fixed to an alveolar bone, an abutment 350 which is coupled to the fixture 310 and to which an artificial tooth is attached, and a coupling element 370 that couples the abutment 350 and the fixture 310 to each other.

The fixture 310 is formed as a single piece, but may be divided into an upper fixture portion 320 and a lower fixture portion 330 in terms of function, and the lower fixture portion 330 of the fixture has first threads 331 formed on the columnar surface thereof, and is formed to extend along the rotation axis C-C of the first threads 331 as a whole. The drawing illustrates that the first threads 331 are formed over the entire surface of the lower fixture portion 330, the first threads 331 may be formed on only a portion of the surface of the lower fixture portion 330.

Figure 5:
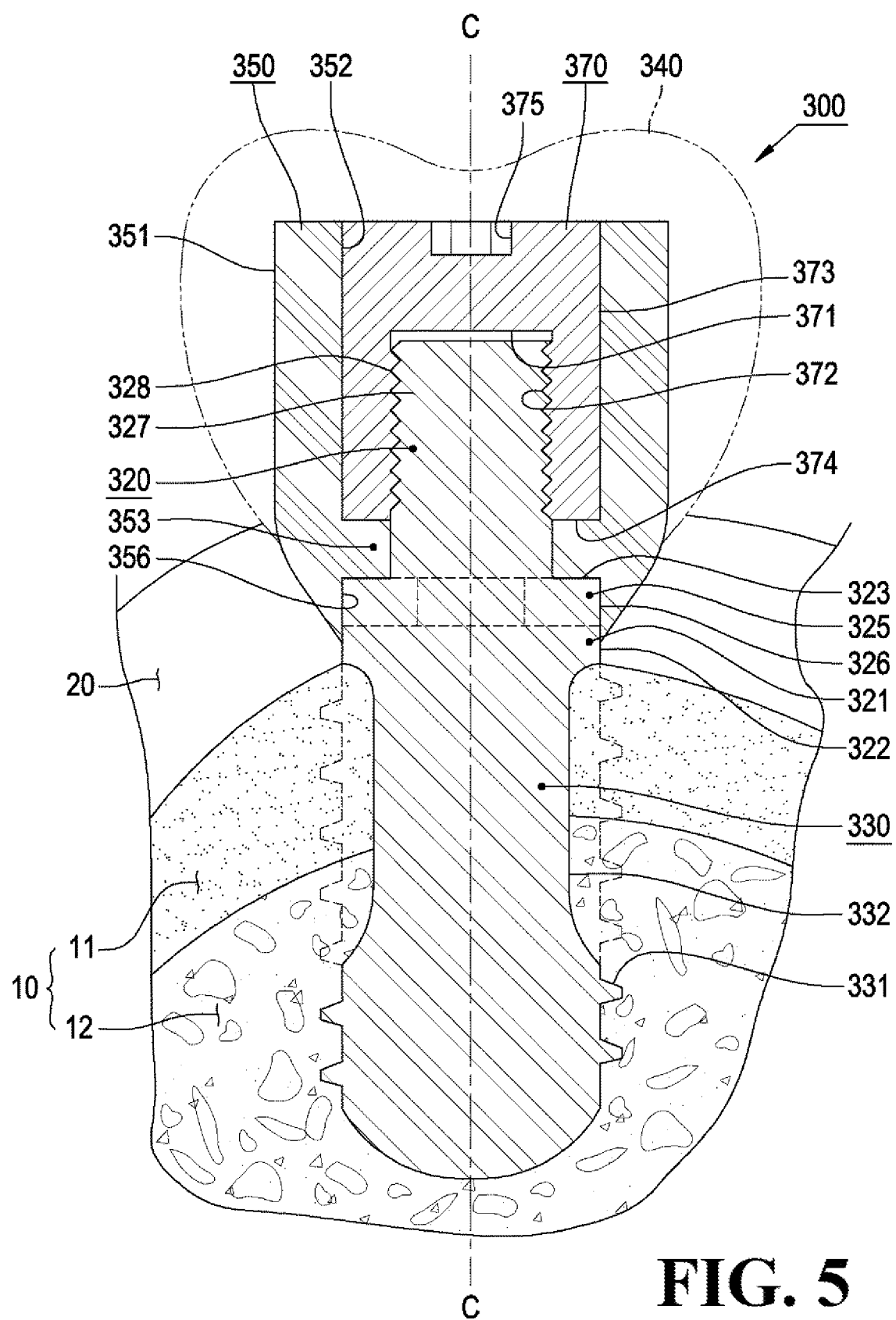
FIGS. 5 and 6 are a vertical sectional view and an exploded perspective view of a dental implant structure according to a first embodiment of the present invention, respectively.
Figure 6:
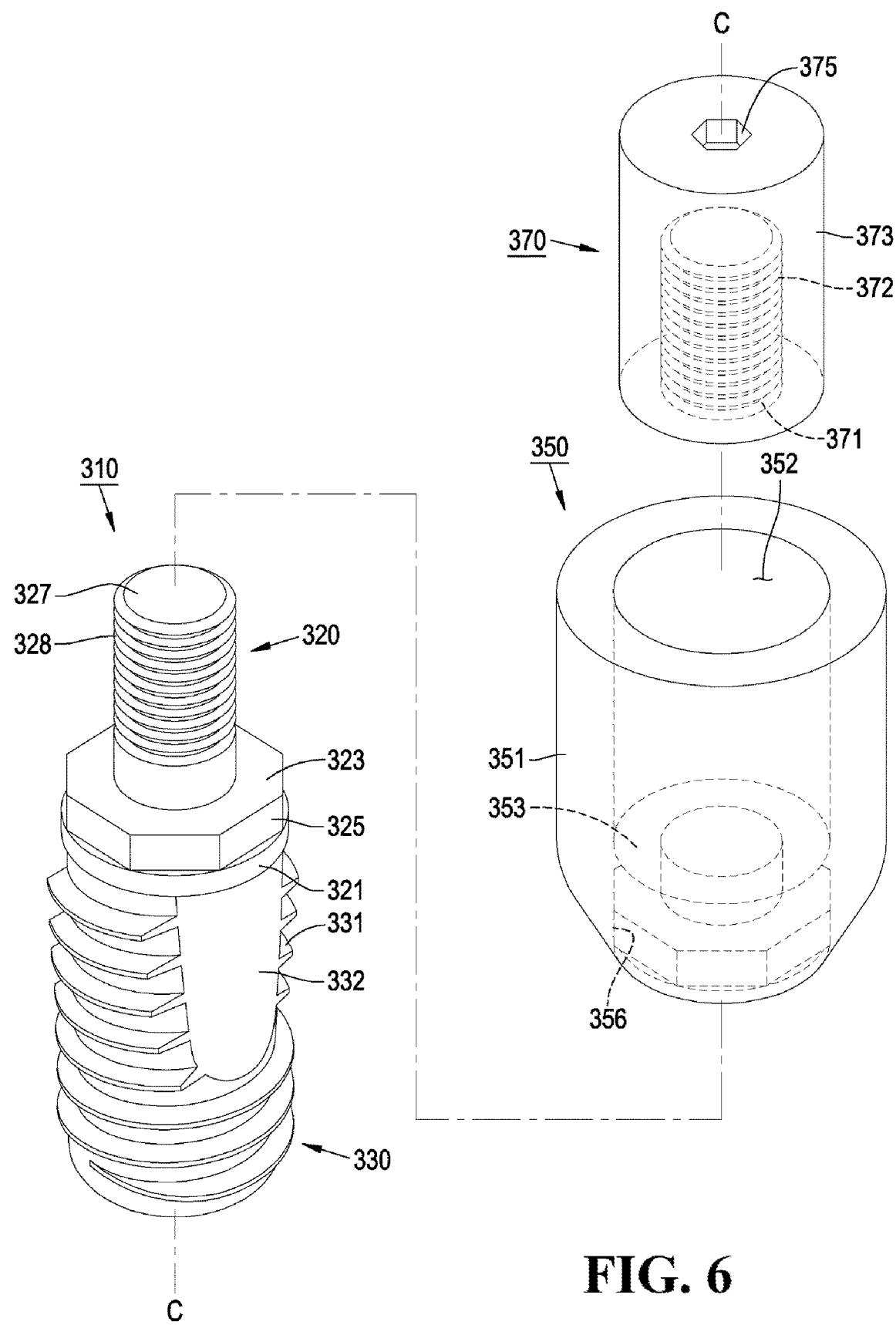

As illustrated in FIG. 5, the lower fixture portion 330 is implanted in the alveolar bone 10 as a whole, and the first threads 331 allow the fixture 310 to be implanted in the alveolar bone 10 such that the fixture 310 coalesces into the alveolar bone tissue.

Although not illustrated in the drawing, tapping edges may be formed on a portion of the surface of the lower fixture portion 330 by cutting a portion of the threads 331. This tapping edge serves to help to form threads in the alveolar bone when the fixture is implanted in the alveolar bone after forming a hole in the alveolar bone for implantation of the fixture.

The upper fixture portion 320 is generally composed of three portions from the lower end to the upper end and includes, in order from the lower portion, a connection portion 321 having a smooth circumferential surface 322 so as to allow the gum 20 to come into contact therewith, a rotation prevention portion 325 extended upward from the connection portion 321 and having a circumferential surface 326 having an octagonal sectional shape, and a coupling portion 327 extending upward from the rotation prevention portion 325 and having second threads 328 continuously formed around the upper portion thereof.

The upper fixture portion 320 has a shape extending along a rotation axis C-C of the second threads 328 of the coupling portion 327 as a whole, and the connection portion 321, the rotation prevention portion 325, and the coupling portion 327, which form the upper fixture portion, are all formed concentrically around the same rotation axis C-C.

The upper and lower fixture portions 320 and 330 are formed along one rotation axis C-C and the first threads 331 and the second threads 328 have the same rotation axis C-C. However, the upper fixture portion 320 and the lower fixture portion 330 and the first threads 331 and the second threads 328 may be formed to be eccentric from each other as required.

The abutment 350 is provided in a shape extending along the rotation axis C-C as a whole. The circumferential surface 351 of the abutment 350 comes into contact with the gum 20 at the lower portion thereof and extends upward so as to form a surface to which the artificial tooth is attached. In addition, a cavity 352, which is an empty space, is formed inside the circumferential surface 351, penetrating the abutment from the upper end to the lower of the abutment.

The cavity 352 is formed in a cylindrical shape with the rotation axis C-C as a center, and a protrusion 353 protruding radially inward toward the rotation axis C-C and an engagement portion 356, which is engaged with the rotation prevention portion 325 on the upper fixture portion, are formed in the lower side thereof.

The protrusion 353 has a generally rectangular cross section and has an upper end that abuts on the lower end surface 374 of the coupling element 370, and thus the protrusion 353 is configured to receive a compressive force applied by the coupling element 370 as the coupling element 370 is screw-coupled onto the upper fixture portion 320. In addition, the lower end surface of the protrusion 353 is formed to abut on the upper end surface 323 of the rotation prevention portion 325 of the upper fixture portion 320 forming the support surface.

Although the protrusion 353 is formed in a rectangular shape in this embodiment, the protrusion 353 is not limited to this shape, and any shape can be used as long as the protrusion 353 abuts on the lower end surface of the engaging element 370 and can receive the compressive force.

The lower portion of the projecting portion 353 in the abutment cavity 352 is formed as an engagement portion 356 having an octagonal cross section that is complementary to the rotation preventing portion 325 in the shape and size and having a height equal to or slightly larger than the height of the rotation prevention portion 325 of the fixture, so as to be engaged with the rotation prevention portion 325 on the upper fixture portion.

The coupling element 370 is formed in a cylindrical shape as a whole, a cavity 371 is formed inside the coupling element 370 upward from the lower end thereof, and third threads 372 are formed around the cavity 371. The cylindrical circumferential surface 373 of the coupling element 370 and the third threads 372 are concentric to each other, and when the fixture 310 and the abutment 350 are coupled to each other, the rotation axis C-C forms the central axis thereof.

The coupling relationship of the fixtures 310, the abutment 350, and the coupling element 370 will be described together with the procedure of implanting the dental implant structure 300 according to the first embodiment.

First, a hole into which the lower fixture portion 330 is inserted is formed in the alveolar bone 10 using a drill or the like, and the fixture 310 is inserted while being rotated. The first threads 331 of the lower fixture portion 330 is fixed to the alveolar bone 10 while forming threads in the alveolar bone 10 by the first threads 331 in the process of inserting. The upper fixture portion 320 protrudes from the upper end of the alveolar bone 10. In the state where the lower fixture portion 330 is fixed to the alveolar bone 10, the abutment 350 may not be coupled or other procedures may not be performed until the fixture 310 coalesces into the alveolar bone tissue. A description in this regard will be omitted.

Next, in a state where the fixture 310 is fixed to the alveolar bone 10, the rotation prevention portion 325 and the coupling portion 327 of the upper fixture portion 320 are inserted into the cavity 352 of the abutment 350, thereby seating the abutment 350 on the upper fixture portion 320.

In this state, when the upper end surface 323 of the rotation prevention portion 325 of the upper fixture portion abuts on the lower end surface of the protrusion 353 of the abutment 350, the abutment 350 is supported by the upper fixture portion 320 from the lower side in the longitudinal direction, and the engagement portion 356 of the abutment is engaged with the rotation prevention portion of the fixture. Thus, the abutment 350 is in the fixed state in which the abutment 350 cannot rotate with respect to the fixture 310.

In this state, the coupling element 370 is fastened. The coupling element 370 is inserted into the cavity 352 of the abutment so as to fasten the third threads 372 of the coupling element and the second threads 328 of the upper fixture portion. Since a tool groove 375 is formed in the upper end of the coupling element 370, a tool such as a driver is inserted into the tool groove 375 and rotated so as to rotate the coupling element 370, whereby thread fastening is achieved.

In the state where the second threads 328 of the fixture and the third threads 372 of the coupling element are fastened to each other, the circumferential surface 373 of the coupling element and the circumferential surface of the cavity 352 of the abutment abut on each other to be supported, and the lower end surface 374 of the coupling element comes into contact with the upper end surface of the protrusion 353 of the abutment so as to press the protrusion 353 of the abutment downward.

By the fastening of the coupling element, the coupling of the dental implant structure 300 of the present embodiment is completed, and the abutment 350 to which the artificial tooth 340 is attached is in a completely fixed state with respect to the fixture 310.

That is, since the circumferential surface of the cavity 352 of the abutment is in contact with the circumferential surface 373 of the coupling element 370, and the coupling element 370 is screw-coupled to the upper fixture portion 320, the position of the abutment 350 on a plane perpendicular to the rotation axis C-C is fixed relative to the fixture 310.

Next, the lower end surface of the protrusion 353 of the cavity 352 of the abutment 350 abuts on the upper end face 323 of the rotation prevention portion 325 of the upper fixture portion 320 to be supported, and the upper end surface of the protrusion 353 abuts on the lower end surface of the coupling element 370, and the coupling element 370 is fixedly screw-coupled to the upper fixture portion 320. Thus, the position of the abutment 350 is fixed between the coupling element 370 and the upper fixture portion 320 so as not to be movable in the direction of the rotation axis C-C.

Finally, the abutment 350 is prevented from rotating about the rotation axis C-C by the frictional force between the circumferential surface of the cavity 352 and the circumferential surface of the coupling element 370 and the frictional force between the abutted surfaces between the protrusion 353 and the upper fixture portion 320 and the coupling element 370. In addition, rotation is disabled by the engagement between the engagement portion 356 of the abutment and the rotation prevention portion 325 of the upper fixture portion having an orthogonal circumferential surface.

Meanwhile, in the dental implant structure of the first embodiment, the rotation prevention portion 325 on the upper fixture portion and the engagement portion 356 of the abutment are formed in the octagonal shape, but the sectional shapes thereof are not limited to the octagonal shape, but may be formed in a polygonal shape, an oval shape, or a circular shape eccentric from the rotation axis C-C. Even with any shape, the shape may be formed to have a deviation in the distance from the rotation axis C-C.

According to the configuration and function of the dental implant structure according to the first embodiment described above, the following three advantages can be obtained.

First, since the screw-coupling for fixing the abutment 350 to the fixture 310 is formed in the upper fixture portion 320, as in the dental implant structure 200 of Document 1 in which horizontal stress acting on the screw-coupled portion due to the occlusal load decreases compared with the submerged-type dental implant structure 100, the horizontal stress acting on the second threads 328 and the third threads 372 due to the occlusal load is minimized, whereby no fear of screw loosening or screw breakage exists or is significantly reduced.

Second, the circumferential surface 351 of the abutment 350 constitutes the surface to which the artificial crown 340 is attached and it is not necessary to dispose or form any element to be coupled to the fixture 310 or the coupling element 370, no restriction is imposed on the shape and dimension of the peripheral surface 351. Thus, the circumferential surface 351 may have a shape and dimension suitable for the artificial tooth 340 attached thereto.

Third, in coupling the abutment 350 and the coupling element 370 to the fixture 310, the abutment can be fixed to the fixture by simply seating the abutment 350 on the upper fixture portion 320 along the longitudinal direction of the fixture without directly applying a fixing force to the abutment 350 or rotating the abutment 350.

Therefore, in coupling the abutment to the fixture at the time of implantation of the dental implant structure, the abutment does not interfere with other teeth around the implantation portion of the dental implant structure, and consequently the shape and dimension of the outer surface of the abutment can be freely selected as required.

Meanwhile, in the dental implant structure of the first embodiment, the material thereof is removed from the upper end of the lower fixture portion 330 downward in the longitudinal direction thereof so as to form two planar coalescence surfaces 332 which are disposed parallel to each other with respect to the rotation axis C-C. The coalescence surfaces 332 are formed to have a depth such that a position closest to the rotation axis C-C is disposed inside the valleys of the first threads 331 of the lower fixture portion 330.

When the upper portion of the alveolar bone in which the dental implant structure is implanted is very narrow, it is not possible to secure a sufficient residual bone width even if a very small diameter fixture is used. Further, when using a very small diameter fixture, it is impossible to obtain a sufficient coalescence area between the fixture and alveolar bone.

However, in the dental implant structure according to the embodiment of the present invention, since the material is removed from the surface of the lower fixture portion 330 which abuts on the side of the alveolar bone in which the bone width is narrow in order to form the coalescence surface 332, a sufficient residual bone width is secured in the portion of the alveolar bone which abuts on the coalescence surface 332. Particularly, since the coalescence surface 332 is formed downward from the upper end of the lower fixture portion 330 which is in contact with the upper portion of a compact bone 11 which is relatively denser in bone quality than the inner cancellous bone 12, thereby enhancing coalescence between the alveolar bone tissue and the fixture.

Therefore, in the dental implant structure of the present invention, when a specific portion of the alveolar bone has a narrow bone width, even though a large-diameter fixture capable of obtaining a sufficient coalescence area is used without using a small-diameter fixture to be matched to the bone width, it is possible to keep a residual bone width of a required thickness by removing the material on the surface of the fixture which abuts on the alveolar bone portion having a narrow bone width, so as to form a flat surface or a curved surface.

Further, one or more coalescence surfaces may be formed over the surface of the fixture in various forms depending on the state and shape of the alveolar bone. In addition to the shape in which the lower fixture portion 330 is cut into a flat surface, various shapes of coalescence surfaces such as a concavely curved coalescence surface and a convexly curved coalescence surface may be used in combination depending the shape and condition of a patient's alveolar bone.

Particularly, in the dental implant structure according to the present invention, since a hole or a material-removed portion for fixing the abutment 350 is not formed in the lower fixture portion 330, various shapes of coalescence surfaces can be freely formed.

Such coalescence surfaces can be applied not only to the dental implant structure of the first embodiment, but also to the dental implant structure of other embodiments described below.

In the dental implant structure according to the first embodiment, an abutment having a shape suitable for application to a front tooth can be applied.

Figure 7:
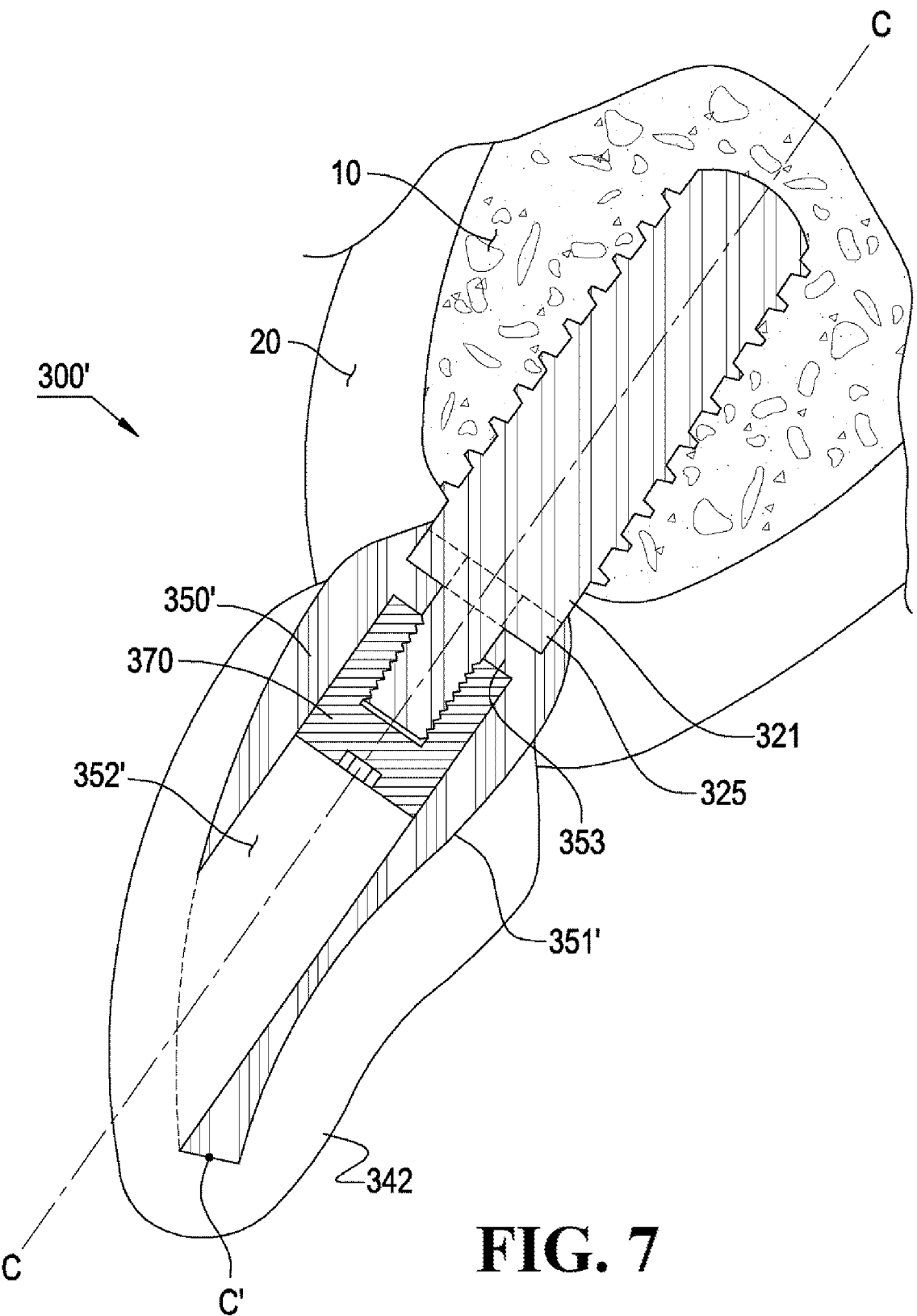
FIG. 7 is a vertical sectional view illustrating a modified example in which the dental implant structure according to the first embodiment of the present invention is applied to a front tooth.

FIG. 7 is a view illustrating an example in which the dental implant structure according to the first embodiment is applied to a front tooth, in the state in which the dental implant structure 300' is applied to an upper front tooth of in the oral cavity.

In the dental implant structure 300' illustrated in FIG. 7, in the abutment 350', the overall shape of the circumferential surface 351' is matched to the shape of an artificial tooth 342 replacing the front tooth.

That is, the circumferential surface 351' of the abutment has a deviation in the length in the vertical direction with respect to the rotation axis C-C. Since the circumferential surface 351' has a shape in which the length is extended upward along the rotation axis C-C from the lower end of the abutment and finally the center C' of the upper end surface is greatly eccentric from the rotation axis C-C, the circumferential surface 351' has an asymmetric shape with respect to the rotation axis C-C as a whole.

In addition, the cavity 352' of the abutment 350' that receives the coupling element 370 extends along the rotation axis C-C, and thus there is a difference in that the upper end of the cavity 352' is formed as an outer surface rather than as the upper end surface of the abutment 350'.

However, the work of fixing the abutment to the fixture and the shape and configuration of the fixture and the coupling element are the same as those of the first embodiment.

As described above, since the abutment 350' having a shape suitable for the front tooth receives a lot of stress in the direction perpendicular to the rotation axis at the time of masticating in which the load is applied thereto due to the contact with the facing front tooth or the food or the like, a strong torque about the rotation axis C-C is inevitably applied. However, in the case of the dental implant structure 300' in which the configuration of the dental implant structure of the first embodiment is applied to the front tooth, the diameter of the rotation prevention portion 325 can be set to be equal to the diameter of the upper fixture portion, so that a relatively strong anti-rotation effect can be obtained.

Next, a second embodiment of the present invention will be described with reference to FIG. 8. A dental implant structure 300-2 of the second embodiment is different from the dental implant structure 300 of the first embodiment in that the circumferential surface 373-2 of the coupling element 370-2 and the inner surface 354-2 of the cavity of the abutment are formed as inclined surfaces.

In the following description and illustration of drawings, the same reference numerals are assigned to substantially the same components as those of the first embodiment, and the description thereof will be omitted while only the features different from those of the dental implant structure 300 of the first embodiment will be described.

First, on the upper fixture portion 320-2, an upper end surface 323-2 is further formed in the connection portion 321-2 as a support surface, and the lower end surface 355 of the abutment 350-2 abuts on the upper end surface 323-2.

Figure 8:
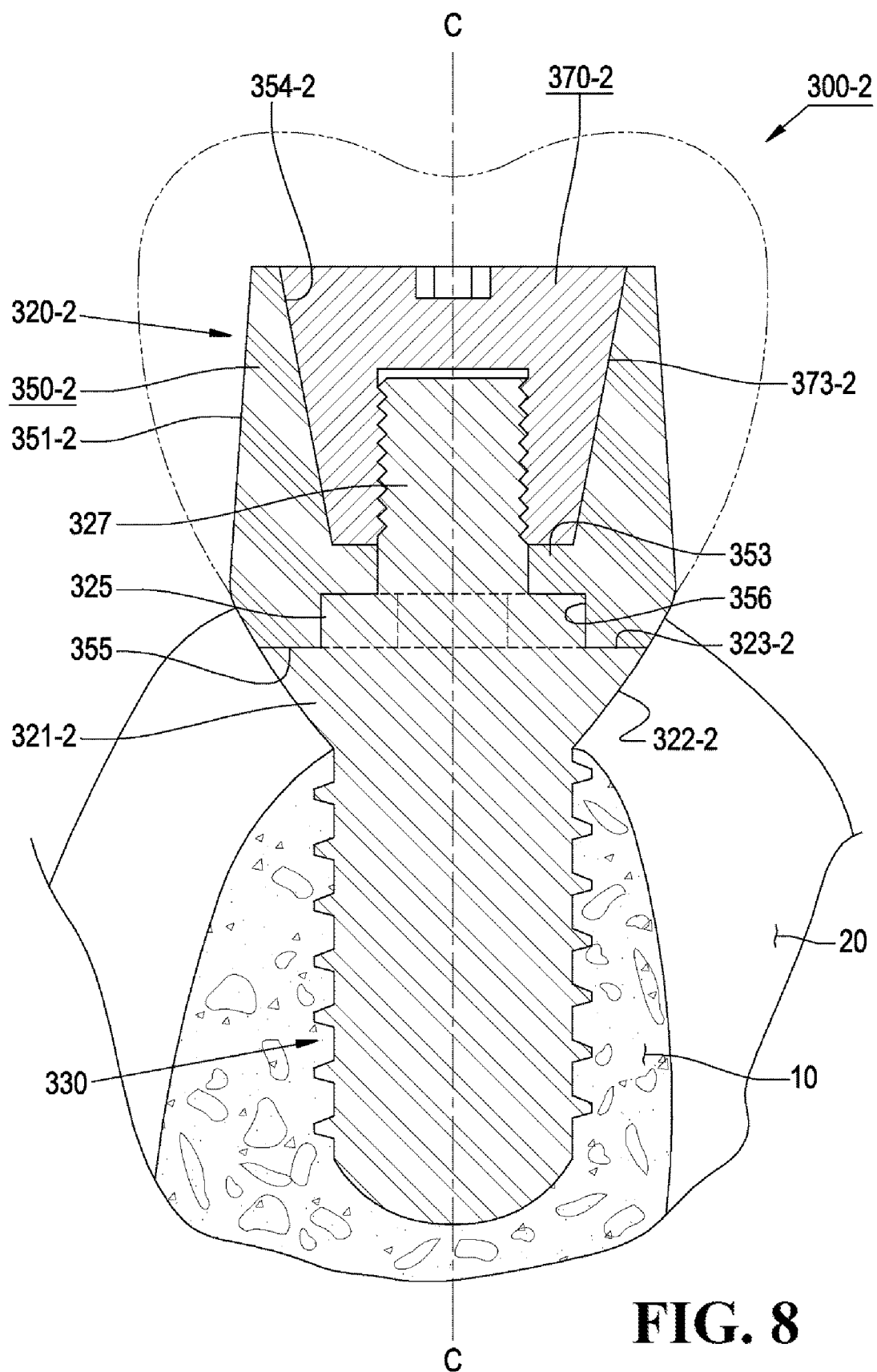
FIG. 8 is a vertical sectional view of a dental implant structure according to a second embodiment of the present invention.

In FIG. 8, the circumferential surface 351-2 of the abutment 350-2 is illustrated as being in contact with the gum 20 at the lower end side thereof, but only the circumferential surface 322-2 of the connection portion 321-2 may be in contact with the gum 20.

The circumferential surface 373-2 of the coupling element 370-2 is formed to be inclined inward in the direction perpendicular to the rotation axis C-C toward the lower portion of the fixture. Correspondingly, the inner surface 354-2 of the cavity of the abutment 350-2 is also formed to be inclined and is engaged with the circumferential surface 373-2 of the coupling element 370-2.

As the inner surface 354-2 of the cavity of the abutment and the circumferential surface 373-2 of the coupling element are inclined as described above, when the coupling element 370-2 is coupled to the upper fixture portion 320-2, the abutment 350-2 is fixed between the upper fixture portion 320-2 and the coupling element 370-2 in the longitudinal direction, and the engagement surface area between the coupling element 370-2 and the abutment 350-2 is increased, and thus the fixing effect of the abutment 350-2 with respect to the coupling element 370-2 due to a frictional force is increased.

Overall, the dental implant structure 300-2 according to the present embodiment has the following advantages in comparison with the implant structure 300 according to the first embodiment.

In the first embodiment, the fixation of the abutment with respect to the fixture in the longitudinal direction and the radial direction is also sufficiently secured by the protrusion 353 of the abutment 350. However, in the second embodiment, a lower surface 355, which abuts on the upper end surface 323-2 of the connection portion of the upper fixture portion 320-2, is additionally provided in the lower end of the abutment and the circumferential surface 373-2 of the coupling element is inclined, so that the abutment can be more securely fixed to the fixture and the supporting effect on the occlusal load can be improved.

Next, the construction and function of a dental implant structure 300-3 according to a third embodiment of the present invention will be described with reference to FIG. 9.

The dental implant structure 300-3 according to the third embodiment is distinguished from those of the other embodiments in that a support portion 376 for the abutment 350-3 is formed on the upper portion of the coupling element 370-3, and a surface, which abuts on the lower end surface of the coupling element, is formed on the abutment.

Hereinafter, only the configurations different from those of the first embodiment will be described. In the following description and illustration of drawings, the same reference numerals are assigned to substantially the same components as those of the first embodiment, and the description thereof will be omitted.

In the dental implant structure 300-3 of the third embodiment, the upper fixture portion 320-3 is not provided with a separate structure for preventing the rotation of the abutment 350, that is, an element similar to the rotation prevention portion 325 of the first embodiment is not formed.

In addition, in the dental implant structure 300-3 of the third embodiment, the protrusion 353 protruding inwardly of the cavity 352 of the abutment 350 is not provided unlikely to the first embodiment.

Instead, in the abutment 350-3, the lower portion of the circumferential surface 354-3 of the cavity thereof abuts on the lower end surface of the coupling element 370-3 and the engagement portion 356 in the first embodiment is not formed in the cavity of the abutment 356.

With this configuration, the lower end surface 355-3 of the abutment 350-3 abuts on the entire upper end surface 323-3 of the connection portion 321 of the fixture, and the upper end surface 323-3 forms a support surface.

Figure 9:
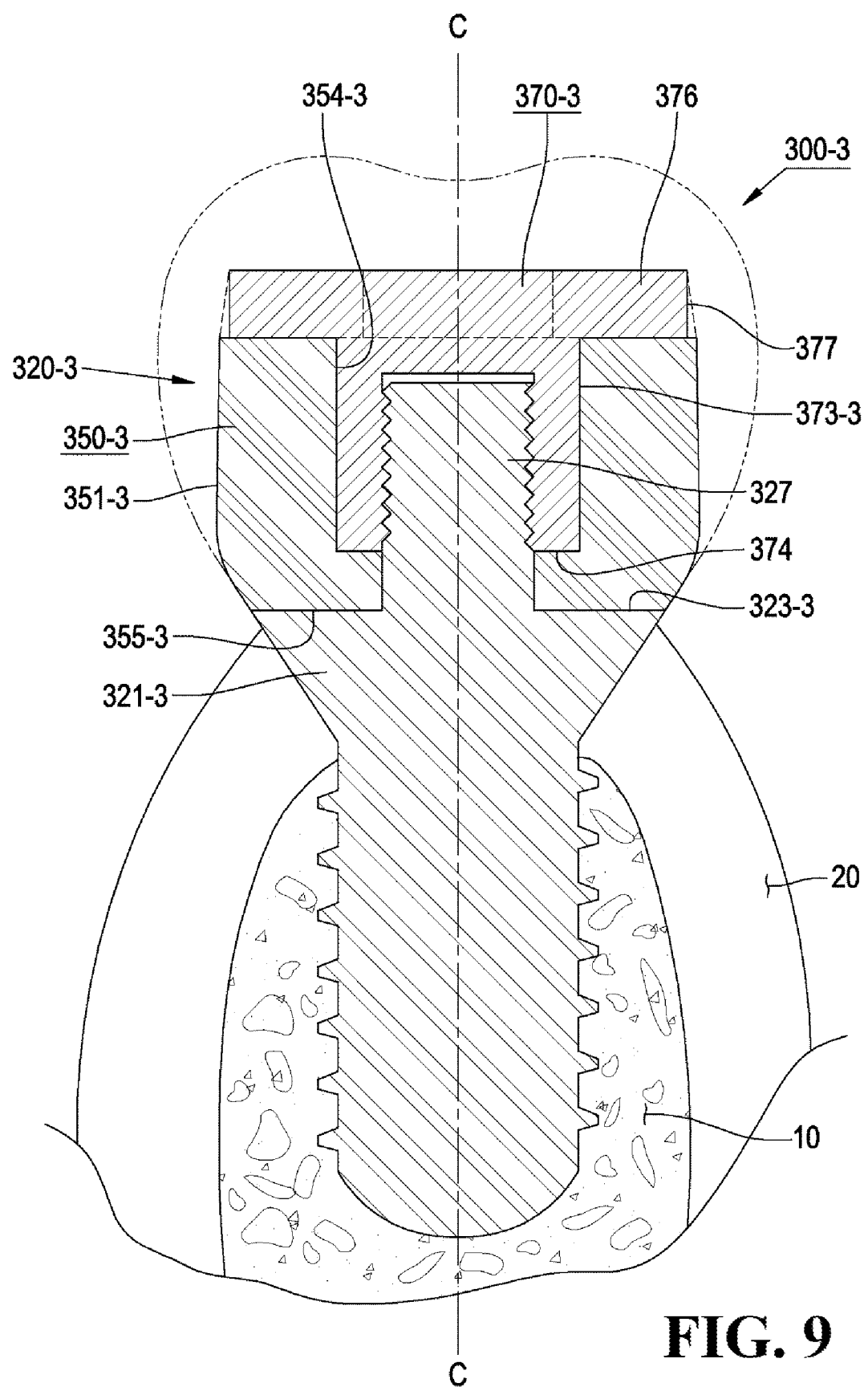
FIG. 9 is a vertical sectional view of a dental implant structure according to a third embodiment of the present invention.

In FIG. 9, while the circumferential surface 351-3 of the abutment is not in contact with the gum 20, but may be formed to be in contact with the gum 20 together with the connection portion 321-3.

In addition, the upper portion of the coupling element 370-3 is provided with a surface, which abuts on the upper end surface of the abutment 350-3 and a support portion 376 protruding radially outward with respect to the rotation axis C-C. On the circumference of the support portion 376, a surface 377 to be engaged with a tool for rotation is formed. However, without providing such a configuration, a tool groove 375 may be formed at the center of the upper end surface of the coupling element, as in the first and second embodiments.

In the dental implant structure 300-3 of the third embodiment having the above-described configuration, the upper fixture portion 320-3 is inserted into the cavity of the abutment 350-3, and then the coupling element 370-3 is rotated.

Thus, the lower end surface 374 of the coupling element presses the abutment 350-3 and then the support portion 376 of the coupling element presses the upper end surface of the abutment in the final rotation step, whereby the upper end surface 323-3 of the connection portion 321-3 and the lower end surface 355-3 of the abutment are brought into contact with each other and the abutment 350-3 is supported on the upper fixture portion 320-3 and, at the same time, the rotation of the abutment is suppressed.

Further, the abutment is fixed in the longitudinal direction with respect to the upper fixture portion by the support portion 376, and the abutment is fixed in the direction perpendicular to the rotation axis C-C by the frictional force resulting from the engagement of the inner surface 354-3 of the cavity of the abutment with the circumferential surface 373-3 of the coupling element.

The rotation prevention portion 325 is not formed in the dental implant structure 300-3 of the third embodiment. However, in particular, by the strong friction in the wide contact surface between the abutment and the upper fixture portion due to the compression by the support portion 376 of the coupling element, it is possible to prevent the rotation of the abutment 325, and since a wide support surface is formed between the abutment and the fixture, it is possible to reliably support the vertical occlusal load exerted on the fixture during mastication.

Meanwhile, in the dental implant structure according to the third embodiment, the surface abutting on the lower end of the coupling element may not be formed around the cavity of the abutment, and the lower end surface of the coupling element may be configured to come into direct contact with a portion of the upper end surface of the connection portion in the upper portion of the upper fixture portion. In this case, second threads may be formed on the entire circumference of the coupling portion 327 as required.

In the dental implant structure according to the third embodiment, the circumferential surface of the coupling element and the circumferential surface of the cavity of the abutment may be inclined as in the second embodiment.

Figure 10:
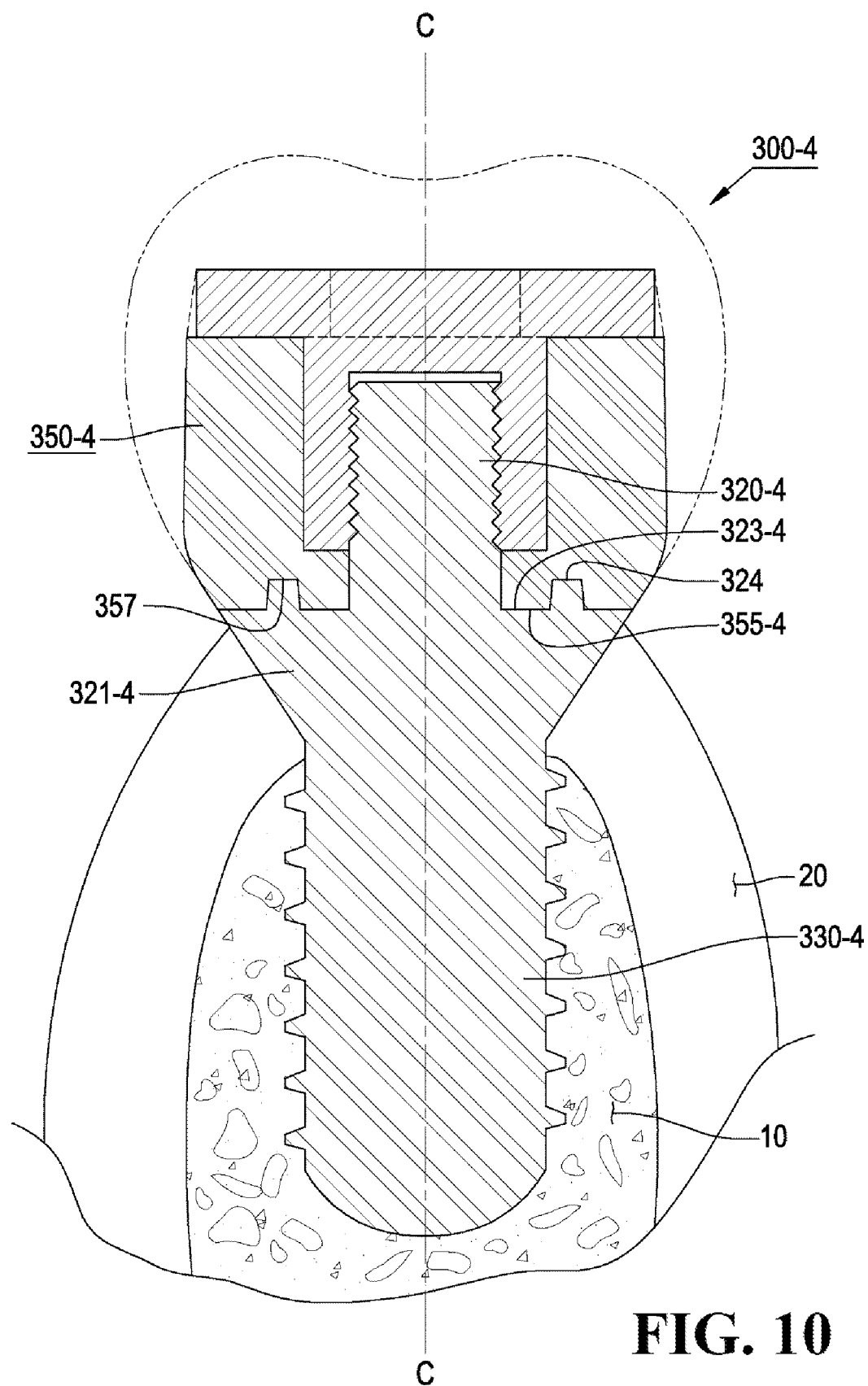
FIGS. 10 and 11 are vertical sectional views of dental implant structures according to a fourth embodiment of the present invention and a modified example thereof.

Next, the construction and function of a dental implant structure 300-4 according to a fourth embodiment of the present invention will be described with reference to FIG. 10.

In the following description and illustration of drawings, the same reference numerals are assigned to the same components as those of the dental implant structure 300-3 according to the third embodiment, and the description thereof is omitted.

An implant structure 300-4 according to the fourth embodiment is distinguished from the implant structure 300-3 according to the third embodiment in that a groove 357 and a protrusion 324 are added as a configuration for preventing the abutment 350-4 from rotating relative to the fixture 310-4.

In the implant structure 300-4 according to the fourth embodiment, a plurality of grooves 357 spaced apart from each other circumferentially around the rotation axis C-C are formed on the lower end surface 355-4 of the abutment, and a plurality of protrusions 324 are formed on the upper end surface 323-4 of the connection portion of the upper fixture portion 320-4 so as to be engaged with the grooves 357. The grooves 357 and the protrusions 324 are engaged with each other so as to prevent the abutment 350-4 from rotating about the rotation axis C-C with respect to the fixture 310-4.

Although it is described that a plurality of grooves 357 and protrusions 324 are provided, it is possible to prevent rotation of the abutment even if only one groove and only one protrusion are provided.

Figure 11:
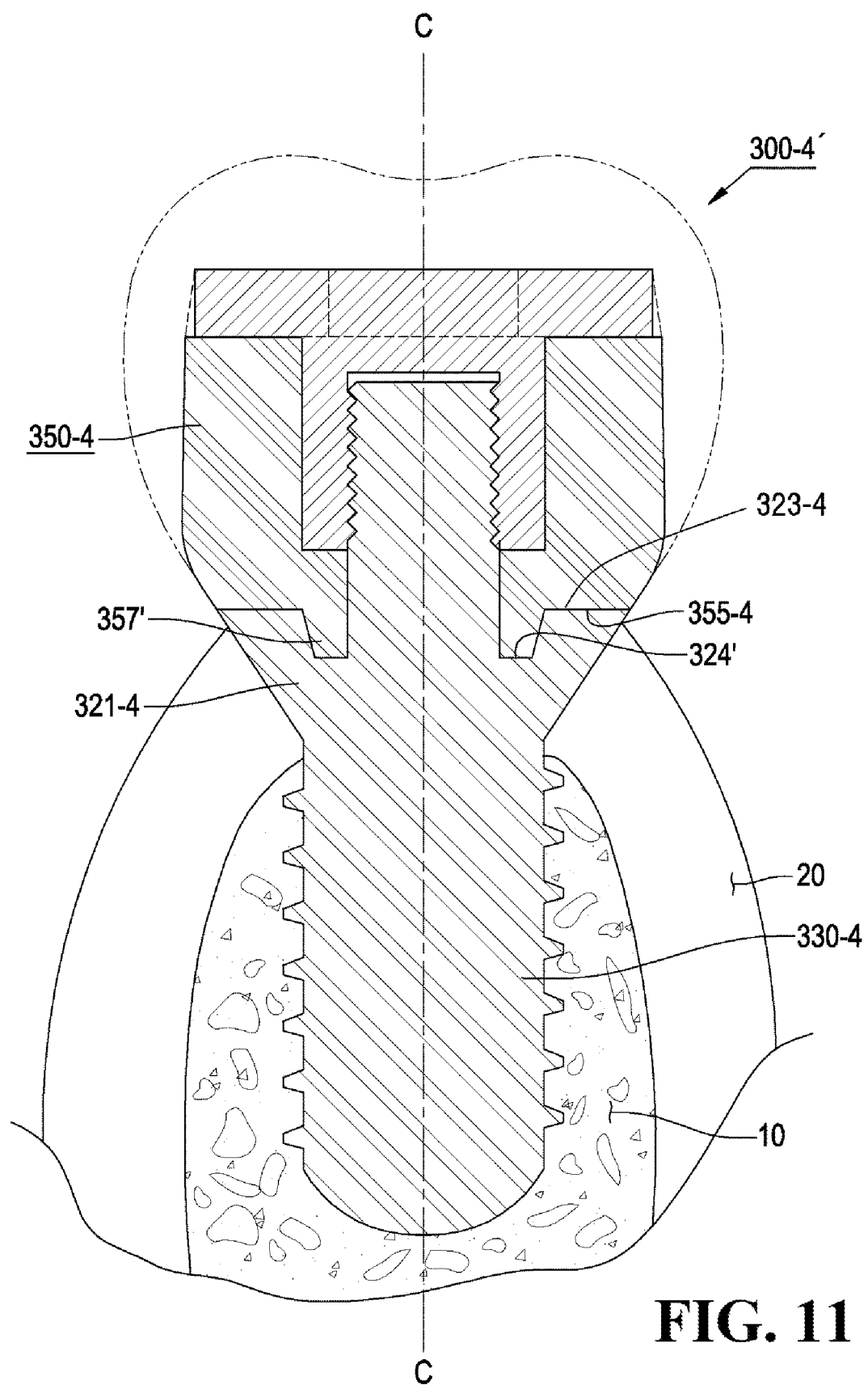

Meanwhile, in the fourth embodiment, the grooves 357 are formed in the abutment and the protrusions 324 are formed in the upper fixture portion. Conversely, in the dental implant structure 300-4' of a modified example shown in FIG. 11, protrusions 357' are formed on the surface of the abutment and the grooves 324' are formed in the upper surface of the connection portion on the upper fixture portion, and even with this configuration, the same action and effect can be obtained.

Figure 12:
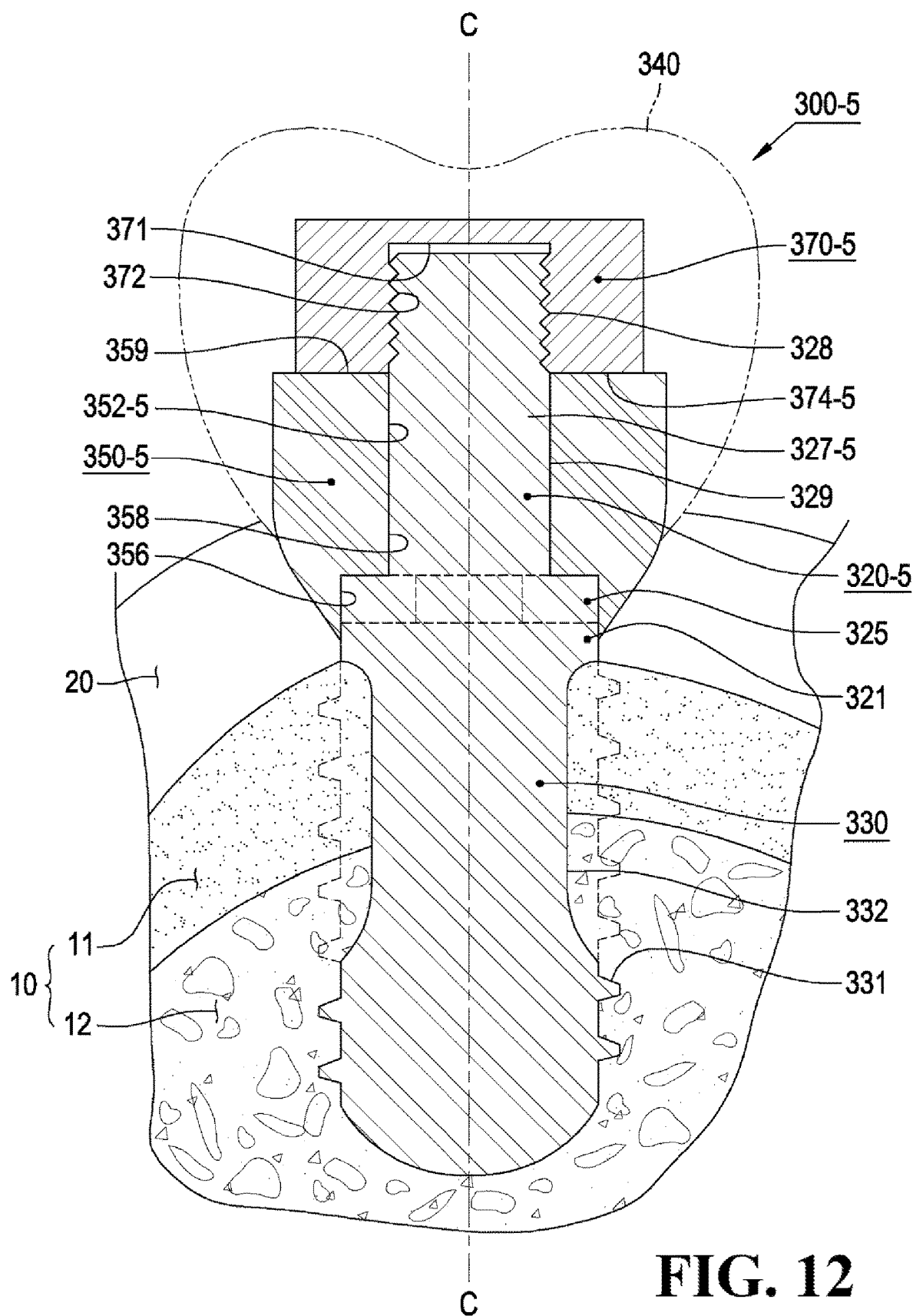
FIG. 12 is a vertical sectional view of a dental implant structure according to a fifth embodiment of the present invention.

Next, a fifth embodiment of the present invention will be described with reference to FIG. 12. A dental implant structure 300-5 of the fifth embodiment differs from the dental implant structures 300 of the first to fourth embodiments in that the dental implant structure 300-5 is configured such that the coupling element 370-5 is not inserted into the cavity of the abutment 350-5 and the lower end surface 374-5 of the coupling element 370-5 abuts on the upper end surface 359 of the abutment.

In the following description and illustration of drawings, the same reference numerals are assigned to substantially the same components as those of the first embodiment, and the description thereof will be omitted while only the features different from those of the dental implant structure 300 of the first embodiment will be described.

In the dental implant structure 300-5 of the fifth embodiment, the upper fixture portion 320-5 has a cylindrical coupling portion 327-5 formed on the upper side of the rotation prevention portion 325, second threads 328 are formed on the upper portion of the coupling portion, and the lower side of the coupling portion is formed by a cylindrical surface 329.

The surface 358 above the engagement portion 356 in the cavity 352-5 of the abutment is formed in a cylindrical shape having a diameter that is enough to come into contact with the lower surface 329 of the coupling portion 327-5. Thus, when the abutment 350-5 is coupled to the upper fixture portion 320-5, the surface 358 of the cavity 352-5 of the abutment is in contact with the surface 329 of the coupling portion 327-5 of the upper fixture portion.

The coupling element 370-5 is formed in a cylindrical shape as a whole, and third threads 372 are formed in the cavity 371 inside the coupling element 370-5 upwardly from the lower end surface 374-5 of the coupling element 370-5.

When the upper fixture portion 320-5 is inserted into the cavity 352-5 of the abutment 350-5 so as to cause the abutment 350-3 to be seated on the upper fixture portion 320-5, the second threads 328 of the upper fixture portion protrudes to the upper side from the upper end surface 359 of the abutment 350-5, and the third threads 372 of the coupling element are engaged therewith.

With this screw-coupling, the lower end surface 374-5 of the coupling element presses the abutment 350-5 downward while coming into contact with the upper end surface 359 of the abutment 350-5, and the abutment 350-5 is supported by the upper fixture portion 320-5 at the lower side thereof, whereby the abutment 350-5 is fixedly supported between the coupling element 370-5 and the upper fixture portion 320-5.

The rotation of the abutment 350-2 is prevented by the rotation prevention portion 325 in the upper fixture portion as in the first embodiment. However, as in the fourth embodiment, the dental implant structure 300-5 according to the fifth embodiment may be configured such that the abutment can be prevented from rotating and can be supported in the longitudinal direction thereof by providing the support surface for the abutment on the upper fixture portion and providing the grooves or protrusions on the upper fixture portion and the lower end of the abutment.

Next, an example in which the dental implant structure 300-2 according to the second embodiment of the present invention is applied to a molar portion will be described with reference to FIGS. 13 to 15.

Figure 13:
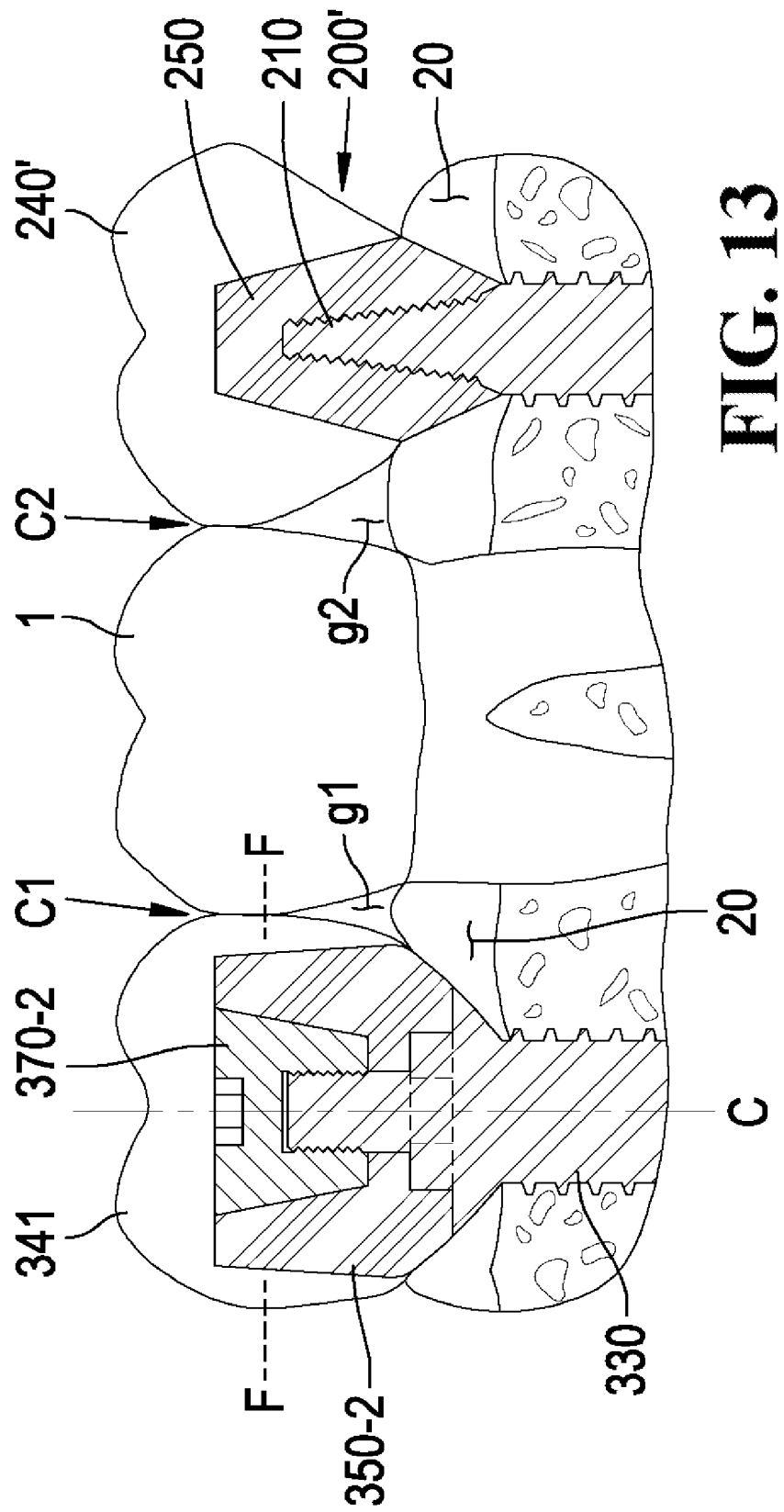
FIGS. 13 to 15 are vertical and horizontal sectional views showing an example in which dental implant structures according to the embodiments of the present invention is applied to molars.

FIG. 13 illustrates that the dental implant structure 300-2 according to the second embodiment, which is provided with an abutment 350-2 suitable for a molar tooth, is implanted on the left side of the natural molar tooth 1, and a dental implant structure 200' having a columnar abutment 250 according to the invention of Document 1 is implanted on the right side.

Figure 15:
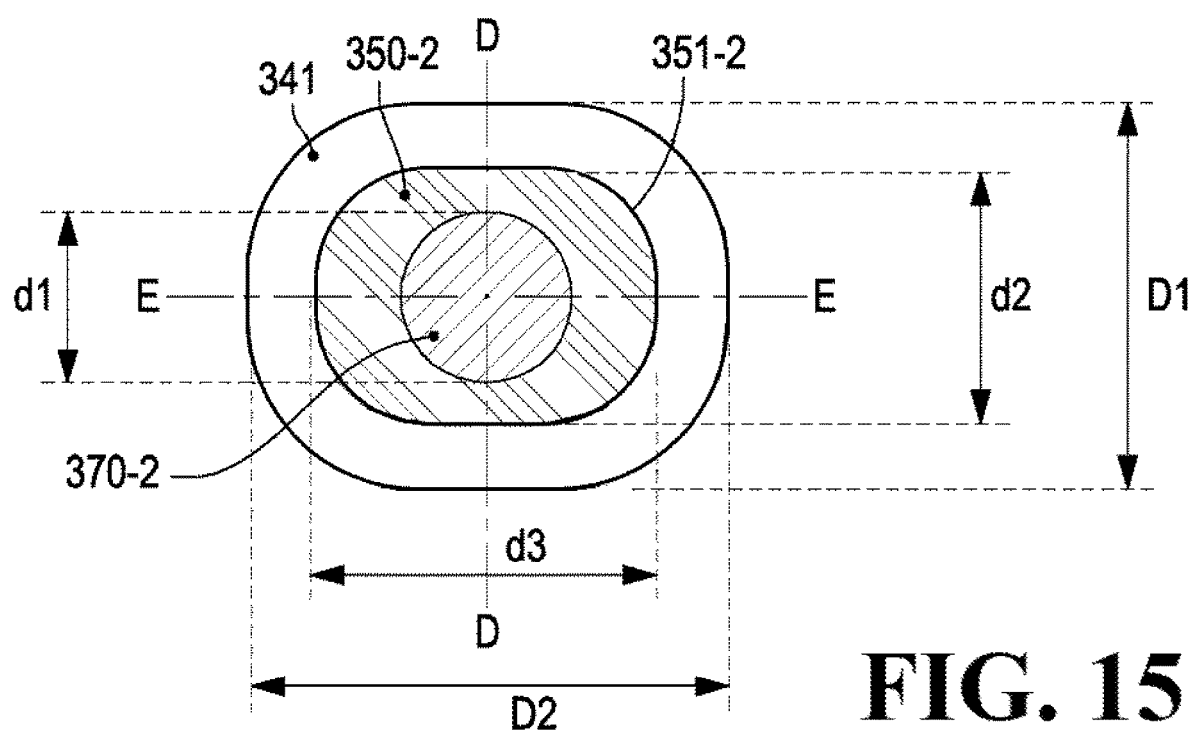

FIG. 15 is a horizontal sectional view taken along line F-F in FIG. 13.

As illustrated in FIG. 15, the artificial crown 341 of the molar tooth are very different from the widths D1 and D2 in the direction of line D-D and the direction of line E-E. The shape of the artificial crown 341 of the molar tooth is matched to the shape of the natural molar tooth replaced by the artificial tooth, and by such a shape, the shape of the artificial crown 341 is well-matched to the surrounding teeth.

Accordingly, the abutment 350-2 to which the artificial crown is attached also has a non-uniform shape corresponding to the shape of the artificial molar crown 341.

In FIG. 15, the surface of the coupling element 370-2 and the surface of the cavity of the abutment are formed in a circular shape having a diameter d1, but the circumferential surface 351-2 of the abutment 350-2 has widths d2 and d3, which are not uniform and are generally adapted to the cross-sectional shape of the artificial crown 341 so as to be suitable for a molar tooth.

FIG. 13 is a vertical sectional view illustrating a relationship in which respective dental implant structures each having an artificial crown 341 replacing a molar tooth are combined with an adjacent natural tooth 1 and a surrounding gum 20 in a direction in which the widths of the artificial crown are wide (in the direction of line E-E in FIG. 15). FIG. 14 is a vertical sectional view illustrating the implant structure on the left side of FIG. 13, which is in harmony with the gum 20 in a direction in which the width of the artificial crown is narrow (in the direction of line D-D in FIG. 15). As can be seen by comparing FIGS. 13 and 14, in the implant structure 300-2' on the left side of the natural tooth 1, the abutment 350-2 has an asymmetric shape in which the circumferential surface 351-2 is not uniform in distance from the rotation axis C-C.

Therefore, in the embodiment of the present invention, since the abutment 350-2 is not rotated, but is moved vertically with respect to the upper fixture portion 320-2 so as to be seated, even if the circumferential surface 351-2 is uneven or asymmetric, the artificial crown 341 may not be interfered with the surrounding teeth during the coupling thereof, and the artificial crown 341 may be formed in a shape that is well-match to the surrounding teeth.

In addition, despite the uneven or asymmetric shape of the abutment 350-2 as described above, it is not necessary to change the shape or configuration of the upper fixture portion 320-2 or the coupling element 370-2.

As illustrated in FIG. 13, it can be seen that the shape of the artificial crown 341 is well-matched to the surrounding teeth and the gum 20 by adopting the abutment 350-2 suitable for a molar tooth.

More specifically, when the length of the abutment 350-2 in the direction of line F-F is increased by the length of the crown of the natural molar tooth 1 in the direction of line F-F, and as a result, when the artificial crown 341 is attached, the adjacent natural tooth 1 and artificial crown 341 are in good contact with each other in the portion indicated by "C1", and a proper void is formed in the lower portion "g1".

On the contrary, it is necessary to adopt a columnar abutment 250 for the dental implant structure 200' located on the right side of the natural molar tooth 1, and as a result, an artificial crown having a shape corresponding to the natural molar tooth cannot be attached.

Of course, in the right dental implant structure 200', a wide artificial crown is also attached so as to be brought into contact C2 with the adjacent tooth. However, by attaching an artificial crown 240', which is excessively larger than the size of the abutment 250, the attachment of the artificial crown to the abutment is weakened. In particular, there is a problem in that a void g2 between the artificial crown 240' and the adjacent tooth becomes excessively large.

As a result, in the dental implant structure according to the present invention, the shape of the outer surface of the abutment to which the artificial crown is attached can be freely selected, so that the artificial crow can be well-matched to the surrounding teeth. As a result, the void between teeth is reduced and the contact between the teeth is formed good, and thus food is less stuck and plaque less builds up, which makes it easier to manage the oral hygiene, so that the long-term prognosis of implants can be improved. In addition, since the circumferential area of the abutment is increased, there is an advantage that the holding force of the artificial crown with respect to the abutment is improved and the crown is not easily detached.

Figure 14:
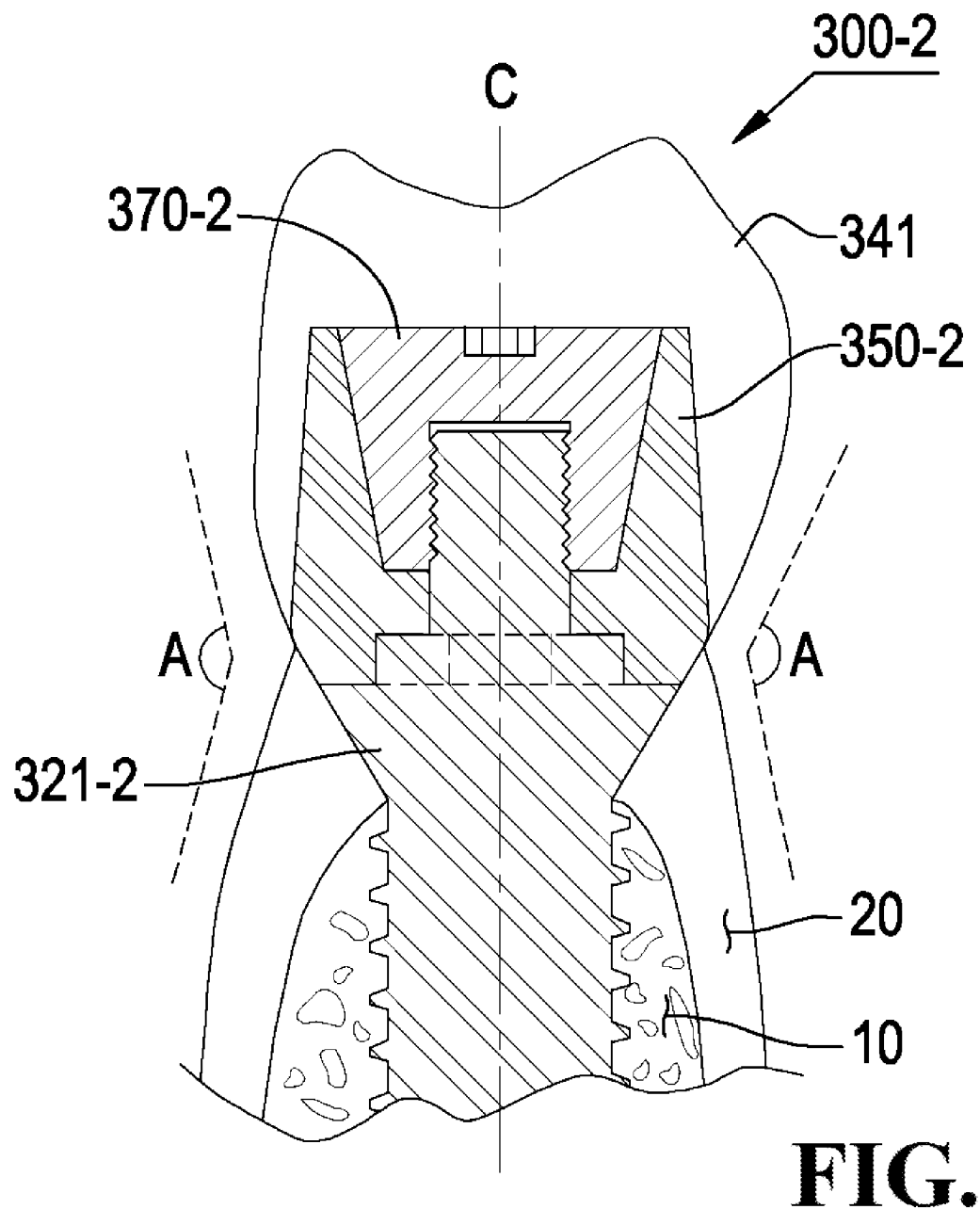

Similarly, as can be seen from FIG. 14, the length of the abutment 350-2 in the direction of line D-D in FIG. 15 corresponds to the length of the gum 20 in the direction of line D-D, it can be observed that after the artificial crown 341 is attached, the angle A between the external lines of the gum and the artificial crown is not a sharp angle, but a very gentle obtuse angle.

Therefore, it is easy to manage oral hygiene because there is no inconvenience that the food left in the mouth is stuck to a location where the gum 20 and the artificial crown 341 meet.

On the contrary, in the prior art dental implant structure 100 illustrated in FIG. 1, when the abutment having the same structure as that of the present embodiment is formed, a coupling screw is easily loosened due to the structure thereof by a large occlusal load and even the breakage of the fixture occurs. In the dental implant structure 200 of Document 1, there is a problem in that it is impossible to mount an abutment having a free shape on the fixture due to interference with an adjacent tooth.

In the dental implant structure according to the present invention, the screw-coupled position of the fixture and the abutment shifts from the lower fixture portion to the upper fixture portion, thereby becoming closer to the artificial crown on which an occlusal load acts. Therefore, it is possible to suppress the screw loosening phenomenon and the breakage phenomenon by reducing the stress due to the occlusal load, and by the abutment coupling structure using the coupling element, it is possible to use not only the prior art columnar abutment but also the abutment having the shape suitable for a molar tooth or a front tooth.

Meanwhile, it has been described that, based on the configuration of the second embodiment of the present invention, it is possible to adopt an abutment having a free shape in which the length from the rotation axis C-C to the circumferential surface thereof is not constant. However, such a feature is not applicable only to the second, and in all the embodiments of the present invention described above, the shape of the abutment can be freely formed, and such an advantage is a unique feature of the present invention.

Although embodiments of the present invention have been described above, the present invention is not limited to these embodiments, and the characteristic features described in the respective embodiments of the present invention may be applied to other embodiments and may be combined with each other. In particular, various changes, modifications, and additions of components can be made without departing from the scope of the present invention defined in the claims. Thus, it is intended that the changes, modifications, and additions fall within the scope of the scope of the present invention.

The invention claimed is:

1. A tooth implant structure comprising:
   a fixture configured to be fixed to an alveolar bone;
   an abutment coupled to the fixture and configured to attach an artificial tooth thereto; and
   a coupling element configured to couple the fixture and the abutment to each other,
   wherein the fixture includes a lower fixture portion that is configured to be fixed to the alveolar bone and an upper fixture portion coupled to the abutment, a first thread is formed on a part or all of a surface of the lower fixture portion so as to be fixed to the alveolar bone, the lower fixture portion has a shape extending along a rotation axis of the first thread, a second thread is formed on a part or all of a surface of the upper fixture portion, and the upper fixture portion has a shape extending along a rotation axis of the second thread,
   wherein the abutment includes an inner cavity into which the upper fixture portion is inserted from a lower end thereof, and an artificial tooth attachment surface provided on an outer surface thereof,
   wherein the coupling element includes therein a third thread coupled to the second thread on the upper fixture portion, and has a shape extending along a rotation axis of the third thread,
   wherein all of the coupling element is inserted into the cavity of the abutment and all of a circumferential surface of the coupling element is in contact with a circumferential surface of the cavity of the abutment,
   wherein the third thread of the coupling element and the second thread of the upper fixture portion are coupled to each other and a part or all of the abutment is placed between the coupling element and the fixture in the direction of the rotation axis of the second thread, and
   wherein the coupling element is configured to press the abutment toward the lower fixture portion by coupling of the third thread and the second thread, and the upper fixture portion is provided with a surface configured to support the abutment against pressing of the coupling element so as to fix the abutment to the fixture.

2. The dental implant structure of claim 1, wherein a part or all of the circumferential surface of the cavity of the abutment and the circumferential surface of the coupling element are formed as inclined surfaces inclining radially inward toward the lower fixture portion and are brought into contact with each other, whereby the abutment is fixedly supported between the coupling element and the fixture.

3. The dental implant structure of claim 1, wherein the cavity of the abutment is provided with a surface on which a lower end surface of the coupling element abuts such that the abutment is fixedly supported between the coupling element and the fixture.

4. The dental implant structure of claim 1, wherein the cavity of the abutment is provided with a protrusion protruding radially inward, and an upper end surface of the protrusion abuts on a lower end surface of the coupling element and a lower end surface of the protrusion abuts on the upper fixture portion such that the abutment is fixedly supported on the fixture.

5. The dental implant structure of claim 1, wherein the upper fixture portion is provided with a circumferential surface with a deviation in distance from the rotation axis of the second thread, and the cavity of the abutment is provided a surface engaged with the circumferential surface of the upper fixture portion so as to prevent the abutment from rotating with respect to the fixture.

6. The dental implant structure of claim 5, wherein the circumferential surface has any one of a polygonal shape, an elliptical shape, or a circular shape a center of which is eccentric from the rotation axis of the second thread, in cross section.

7. The dental implant structure of claim 1, wherein a protrusion extending in a direction parallel to a longitudinal direction of the rotation axis of the second thread is formed on the upper fixture portion, and a groove is formed in the abutment to be engaged with the protrusion.

8. The dental implant structure of claim 1, wherein a protrusion extending in a direction parallel to a longitudinal direction of the rotation axis of the second thread is formed on the abutment, and a groove is formed in the upper fixture portion to be engaged with the protrusion.

9. The dental implant structure of claim 1, wherein the surface of the lower fixture portion is provided with a coalescence surface, which is concavely formed in an inside of a valley of the first thread toward the rotation axis of the first thread by removing a portion of a material of the lower fixture portion so as to increase a coalescence area with the alveolar bone, or a coalescence surface formed in a flat or curved surface extending to the inside of the valley of the first thread toward the rotation axis of the first thread so as to maintain a minimum thickness of the alveolar bone surrounding the lower fixture portion and to increase a coalescence area between the lower fixture portion and the alveolar bone, the coalescence surface being formed to extend downwardly from an upper end of the lower fixture portion in the longitudinal direction of the lower fixture portion.

10. The dental implant structure of claim 1, wherein the artificial tooth is spaced apart from the fixture such that the artificial tooth does not directly contact the fixture when the artificial tooth is attached to the abutment.

\* \* \* \* \*